(12) United States Patent
Song et al.

(10) Patent No.: US 9,277,224 B2
(45) Date of Patent: *Mar. 1, 2016

(54) METHOD AND APPARATUS FOR ENCODING VIDEO, AND METHOD AND APPARATUS FOR DECODING VIDEO

(71) Applicant: SAMSUNG ELECTRONICS CO., LTD., Suwon-si, Gyeonggi-do (KR)

(72) Inventors: Hak-sup Song, Suwon-si (KR); Jung-hye Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/897,823

(22) Filed: May 20, 2013

(65) Prior Publication Data
US 2013/0329788 A1    Dec. 12, 2013

Related U.S. Application Data

(63) Continuation of application No. 13/553,422, filed on Jul. 19, 2012, now Pat. No. 8,446,953, which is a continuation of application No. 13/371,874, filed on Feb. 13, 2012, now Pat. No. 8,270,486, which is a continuation of application No. 12/857,682, filed on Aug. 17, 2010.

(30) Foreign Application Priority Data

Aug. 17, 2009  (KR) .................. 10-2009-0075854

(51) Int. Cl.
*H04N 19/105* (2014.01)
*H04N 19/176* (2014.01)

(Continued)

(52) U.S. Cl.
CPC ............. *H04N 19/105* (2014.11); *H04N 19/11* (2014.11); *H04N 19/134* (2014.11); *H04N 19/14* (2014.11);

(Continued)

(58) Field of Classification Search
CPC . H04N 7/50; H04N 7/26244; H04N 7/26271; H04N 7/26015; H04N 7/26031; H04N 19/00042; H04N 19/00315; H04N 19/00533; H04N 7/32
USPC .............. 375/240.12, 240.13, 240.16, 240.19
IPC ......................................................... H04B 1/66
See application file for complete search history.

(56) References Cited

U.S. PATENT DOCUMENTS 6,556,718 B1 *  4/2003  Piccinelli et al. ............. 382/236
7,369,707 B2 *  5/2008  Sakaguchi et al. ............ 382/239

(Continued)

FOREIGN PATENT DOCUMENTS

CN    1819657 A    8/2006
CN    1857001 A    11/2006

(Continued)

OTHER PUBLICATIONS

Communication dated Mar. 26, 2013 issued by the Russian Patent Office in counterpart Russian Patent Application No. 2012105475/08.

(Continued)

*Primary Examiner* — Tung Vo
(74) *Attorney, Agent, or Firm* — Sughrue Mion, PLLC

(57) ABSTRACT

Disclosed are method and apparatus for encoding and decoding an image which divides a current picture into blocks with various sizes and varies a number of intra prediction modes according to the sizes of the divided blocks.

2 Claims, 25 Drawing Sheets

(51) Int. Cl.
*H04N 19/134* (2014.01)
*H04N 19/96* (2014.01)
*H04N 19/593* (2014.01)
*H04N 19/11* (2014.01)
*H04N 19/14* (2014.01)
*H04N 19/80* (2014.01)

(52) U.S. Cl.
CPC ........... *H04N 19/176* (2014.11); *H04N 19/593* (2014.11); *H04N 19/80* (2014.11); *H04N 19/96* (2014.11)

(56) References Cited

U.S. PATENT DOCUMENTS

| | | | |
|---|---|---|---|
| 7,782,955 B2* | 8/2010 | Chen et al. | 375/240.2 |
| 7,840,096 B2* | 11/2010 | Song | 382/300 |
| 7,881,377 B2* | 2/2011 | Arimura et al. | 375/240.12 |
| 7,912,302 B2* | 3/2011 | Stein et al. | 382/234 |
| 8,085,845 B2* | 12/2011 | Tourapis et al. | 375/240.16 |
| 8,085,846 B2* | 12/2011 | Tourapis et al. | 375/240.16 |
| 8,098,731 B2* | 1/2012 | Sohn et al. | 375/240.16 |
| 8,111,914 B2* | 2/2012 | Lee et al. | 382/166 |
| 8,155,197 B2 | 4/2012 | Nakaishi | |
| 8,223,846 B2 | 7/2012 | Huang et al. | |
| 8,224,100 B2 | 7/2012 | Jeong | |
| 8,259,803 B2 | 9/2012 | Chen et al. | |
| 8,270,486 B2* | 9/2012 | Song et al. | 375/240.12 |
| 8,446,953 B2* | 5/2013 | Song et al. | 375/240.12 |
| 2003/0223496 A1 | 12/2003 | Sun et al. | |
| 2005/0271142 A1 | 12/2005 | Lee et al. | |
| 2006/0126727 A1 | 6/2006 | Kim et al. | |
| 2006/0176962 A1 | 8/2006 | Arimura et al. | |
| 2006/0251330 A1 | 11/2006 | Toth et al. | |
| 2006/0262983 A1 | 11/2006 | Cheng et al. | |
| 2007/0019726 A1 | 1/2007 | Cha et al. | |
| 2007/0071096 A1 | 3/2007 | Chen et al. | |
| 2007/0133891 A1 | 6/2007 | Jeong | |
| 2007/0147498 A1 | 6/2007 | Tanaka et al. | |
| 2007/0171969 A1 | 7/2007 | Han et al. | |
| 2008/0043843 A1 | 2/2008 | Nakaishi | |
| 2008/0137740 A1 | 6/2008 | Thoreau et al. | |
| 2008/0232471 A1 | 9/2008 | Mittal et al. | |
| 2008/0304759 A1 | 12/2008 | Lee et al. | |
| 2013/0251039 A1 | 9/2013 | Drugeon et al. | |
| 2015/0201195 A1 | 7/2015 | Moriya et al. | |

FOREIGN PATENT DOCUMENTS

| | | |
|---|---|---|
| CN | 1984341 A | 6/2007 |
| CN | 101001383 A | 7/2007 |
| CN | 1 01 21 7669 A | 7/2008 |
| EP | 1 538 566 A2 | 6/2005 |
| EP | 1 796 395 A2 | 6/2007 |
| EP | 2 081 386 A1 | 7/2009 |
| JP | 2001-204024 A | 7/2001 |
| JP | 2007-166617 A | 6/2007 |
| JP | 2007-228096 | 9/2007 |
| JP | 2008-131643 A | 6/2008 |
| JP | 2009-177352 A | 8/2009 |
| KR | 10-2006-0027842 A | 3/2006 |
| RU | 2 329 615 C2 | 1/2008 |
| WO | 2007034918 A1 | 3/2007 |
| WO | 2009-051719 A2 | 4/2009 |
| WO | 2009-090884 A1 | 7/2009 |
| WO | 2009-097809 A1 | 8/2009 |

OTHER PUBLICATIONS

International Search Report (PCT/ISA/220) issued in PCT/KR2010/005436, dated Feb. 23, 2011.
Communication dated Nov. 13, 2013 issued by the Canadian Intellectual Property Office in counterpart Canadian Patent Application No. 2,770,995.
Communication dated Oct. 21, 2013 issued by the Russian Patent Office in counterpart Russian Patent Application No. 2013113953/08.
Communication dated Oct. 28, 2013 issued by the Russian Patent Office in counterpart Russian Patent Application No. 2013113952/08.
Communication dated Dec. 10, 2013 issued by the Japanese Patent Office in counterpart Japanese Patent Application No. 2012-525479.
Kim, et al, "Enlarging MB size for high fidelity video coding beyond HD", ITU—Telecommunications Standardization Sector Study Group 16 Question 6 Video Coding Experts Group (VCEG) 36th Meeting: San Diegao, USA, Oct. 5, 2008, [VCEG-AJ21, 7 pgs. total.
Lim, et al., "Intra coding using extended block size", ITU—Telecommunications Standardization Sector Study Group 16 Question 6 Video Coding Experts Group (VCEG) 38th Meeting: London, UK / Geneva, CH, Jul. 7, 2009 [VCEG-AL28], 6 pgs. total.
Communication dated Dec. 10, 2013 issued by the Japanese Patent Office in counterpart Japanese Patent Application No. 2013-211775.
Communication dated Dec. 10, 2013 issued by the Japanese Patent Office in counterpart Japanese Patent Application No. 2013-211776.
Communication dated Jun. 26, 2014 issued by the European Patent Office in counterpart European Patent Application No. 10810146.0.
Communication dated Jun. 26, 2014 issued by the European Patent Office in counterpart European Patent Application No. 13185319.4.
Communication dated Jun. 26, 2014 issued by the European Patent Office in counterpart European Patent Application No. 13185327.7.
Takeshi Tsukuba et al:"Adaptive Multidirectional Intra Prediction", ITU-T SG16 Q6 Video Coding Experts Group, 33. VCEG Meeting, Document VCET-AG05, Shenzhen, China, No. VCEG-AG05, Oct. 20, 2007, pp. 1-6, XP002501810.
Iain E. Richardson:"H.264 and MPEG-4 Video Compression, chapter 6, H.264/MPEG Part 10", Oct. 17, 2003, John Wiley&Sons, XP030001626; 65pgs.
Communication dated Jul. 21, 2014 issued by the Korean Intellectual Property Office in counterpart Korean Patent Application No. 10-2009-0075854.
Communication dated Aug. 26, 2014 issued by the Japanese Patent Office in counterpart Japanese Patent Application No. 2013-211775.
Communication dated Aug. 26, 2014 issued by the Japanese Patent Office in counterpart Japanese Patent Application No. 2013-211776.
Madhukar Budagavi,"Angular intra prediction and ADI simplification", Joint Collaborative Team on Video Coding (JCT-VC) of ITU-T SG16 WP3 and ISO/IEC JTC1/SC29/WG11 2nd Meeting: Geneva, CH, Jul. 28, 2010, [JCTVC-B118],pp. 1-5.
"Test Model under Consideration", Joint Collaborative Team on Video Coding (JCT-VC) of ITU-T SG16 WP3 and ISO/IEC JTC1/SC29/WG11 2nd Meeting: Geneva, CH, Jul. 28, 2010, [JCTVC-B205],pp. 1,62-64,122-123.
Communication dated Nov. 12, 2014 issued by Canadian Intellectual Property Office in counterpart Canadian Application No. 2770995.
Communication dated Jan. 6, 2015 issued by Japanese Patent Office in counterpart Japanese Patent Application No. 2012-525479.
Communication dated Mar. 27, 2014 issued by the State Intellectual Property Office of P.R. China in counterpart Chinese Patent Application No. 201080036789.6.
Communication dated May 16, 2014 issued by the Intellectual Property Office of Australia in counterpart Australian Patent Application No. 2014200535.
Communication dated May 23, 2014 issued by the Intellectual Property Office of Australia in counterpart Australian Patent Application No. 2014200538.
Communication dated May 20, 2014 issued by the Intellectual Property Office of Australia in counterpart Australian Patent Application No. 2014200536.
Communication dated May 6, 2015 issued by the State Intellectual Property Office of P.R. China in counterpart Chinese Patent Application No. 201310096284.4 English Translation.
Communication dated May 15, 2015 issued by the Australian Patent Office in counterpart Australian Patent Application No. 2014200535.
Communication dated Jul. 14, 2015 issued by the Japanese Patent Office in counterpart Japanese Patent Application No. 2014-099018 English Translation.

(56) References Cited

OTHER PUBLICATIONS

Communication dated Jul. 14, 2015 issued by the Japanese Patent Office in counterpart Japanese Patent Application No. 2014-099019 English Translation.
Communication dated Jul. 14, 2015 issued by the Japanese Patent Office in counterpart Japanese Patent Application No. 2014-099020 English Translation.
Communication dated Jul. 21, 2015 issued by the European Patent Office in counterpart European Patent Application No. 13 185 319.4.
Communication dated Jul. 21, 2015 issued by the European Patent Office in counterpart European Patent Application No. 13 185 327.7.
A Communication dated Jul. 23, 2015 issued by the European Patent Office in counterpart European Patent Application No. 10 810 146.0.
Feng Pan, et al.; Fast Mode Decision for Intra Prediction, Joint Video Team (JVT) of ISO/IEC MPEG & ITU-T VCEG (ISO/IEC JTC1/SC29/WG11 and ITU-T SG16 Q.6) 7th Meeting: Pattaya II, Thailand, Jul. 3, 2003; JVT-G013; pp. 1-26 (27 pgs. total).
McCann K et al; Video Coding Technology Proposal by Samsung (and BBC),"Samsung's Response to the Call for Proposals on Video Compression Technology," JCT-VC Meeting, (Joint collaborative team on video coding of ISO/IEC JTC1/SC29/WG11 and ITU-TSG), Jun. 1, 2010, XP30007573A, 42 pgs. total.
McCann K et al; Video Coding Technology Proposal by Samsung (and BBC), "Samsung and BBC response to Call for Proposals on Video Compression Technology," JCT-VC Meeting, (Joint collaborative team on video coding of ISO/IEC JTC1/SC29/WG11 and ITU-TSG), Apr. 16, 2010, XP30007574, 36 pgs. total.
Communication dated Aug. 5, 2015, issued by the State Intellectual Property Office of China in counterpart Chinese Application No. 201310096270.2.
Communication dated Sep. 9, 2015, issued by the European Patent Office in counterpart European Application No. 15168609.4.
Min J H et al, "Unification of the directional intra prediction methods in TMuC", 2 JCT-VC Meeting; Jul. 21, 2010-Jul. 28, 2015; Geneva; (Joint Collaborativeteam on Video Coding of ISO/IEC JTC1/SC29/WG11 and ITU-T ST.16); URL://http://wftp3.itu.int/av-arch/jctvc-site/,, No. JCTVC-B100, Jul. 22, 2010, Total 3 pages, XP 030007680, ISSN:0000-0046.
Communication dated Sep. 9, 2015, issued by the European Patent Office in counterpart European Application No. 15168611.0.
Communication dated Oct. 6, 2015, issued by the Japanese Intellectual Property Office in counterpart Japanese Application No. 2015-015775.
Communication dated Oct. 6, 2015, issued by the Japanese Intellectual Property Office in counterpart Japanese Application No. 2015-015776.

* cited by examiner

CODING UNITS (1010)

FIG. 14

| SIZE OF CODING UNIT | NUMBER OF PREDICTION MODES | | |
| --- | --- | --- | --- |
| | Example 1 | Example 2 | Example 3 |
| 2 | – | 5 | 5 |
| 4 | 9 | 9 | 9 |
| 8 | 9 | 9 | 9 |
| 16 | 33 | 17 | 11 |
| 32 | 33 | 33 | 33 |
| 64 | 5 | 5 | 9 |
| 128 | 5 | 5 | 5 |

| PREDICTION MODE | NAME |
|---|---|
| 0 | VERTICAL |
| 1 | HORIZONTAL |
| 2 | DC |
| 3 | DOWN_LEFT |
| 4 | DOWN_RIGHT |
| 5 | VERTICAL_RIGHT |
| 6 | HORIZONTAL_DOWN |
| 7 | VERTICAL_LEFT |
| 8 | HORIZONTAL_UP |

PREDICTION MODE DIRECTION

■ : NEIGHBORING PIXEL

US 9,277,224 B2

METHOD AND APPARATUS FOR ENCODING VIDEO, AND METHOD AND APPARATUS FOR DECODING VIDEO

CROSS-REFERENCE TO RELATED PATENT APPLICATION

This is a continuation application of U.S. Ser. No. 13/553,422 filed Jul. 19, 2012, in the U.S. Patent and Trademark Office, which is a continuation of U.S. application Ser. No. 13/371,874, filed Feb. 13, 2012, in the U.S. Patent and Trademark Office, now U.S. Pat. No. 8,270,486 issued Sep. 18, 2012, which is a continuation of U.S. application Ser. No. 12/857,682, filed on Aug. 17, 2010, in the U.S. Patent and Trademark Office, which claims priority from Korean Patent Application No. 10-2009-0075854, filed on Aug. 17, 2009, in the Korean Intellectual Property Office, the disclosures of which are incorporated herein by reference in their entireties.

BACKGROUND

1. Field

The exemplary embodiments relate to encoding and decoding a video, and more particularly, to a method and apparatus for encoding and decoding a video which performs intra prediction by selecting an intra prediction mode according to a size of an intra-predicted data unit.

2. Description of the Related Art

According to an image compression standard, such as moving picture expert group (MPEG)-1, MPEG-2, MPEG-4, or H.264/MPEG-4 advanced video coding (AVC), a picture is split into macroblocks for video encoding. After each of the macroblocks is encoded in any of inter prediction and intra prediction encoding modes, an appropriate encoding mode is selected according to a bit rate required for encoding the macroblock and an allowable distortion between the original macroblock and the decoded macroblock. Then the macroblock is encoded in the selected encoding mode.

As hardware for reproducing and storing high resolution or high quality video content is being developed and supplied, a need for a video codec for effectively encoding or decoding the high resolution or high quality video content is increasing. In a conventional video codec, a video is encoded according to a limited encoding method based on a macroblock having a predetermined size.

SUMMARY

The exemplary embodiments provide a method and apparatus for encoding and decoding a video which uses an intra prediction method having various directivities based on hierarchical coding units having various sizes.

According to an exemplary embodiment, there is provided a method of encoding an image, the method including: dividing a current picture into at least one block having a predetermined size; determining an intra prediction mode to be applied to a current block to be encoded according to a size of the current block; and performing intra prediction on the current block according to the determined intra prediction mode, wherein the intra prediction mode comprises a prediction mode for performing prediction by using an extended line having an angle of $\tan^{-1}(dy/dx)$ (dx and dy are integers) about each pixel inside the current block.

According to another aspect of an exemplary embodiment, there is provided a method of decoding an image, the method including: dividing a current picture into at least one block having a predetermined size; extracting information about an intra prediction mode applied to a current block to be decoded from a bitstream; and performing intra prediction on the current block according to the extracted intra prediction mode, wherein the intra prediction mode comprises a prediction mode for performing prediction by using an extended line having an angle of $\tan^{-1}(dy/dx)$ (dx and dy are integers) about each pixel of the current block.

According to another aspect of the exemplary embodiment, there is provided an apparatus for encoding an image, the apparatus including: an intra prediction mode determiner for determining an intra prediction mode that is to be performed according to a size of a current block to be encoded; and an intra prediction performer for performing intra prediction on the current block to be encoded according to the intra prediction mode, wherein the intra prediction mode includes a prediction mode for performing prediction by using an extended line having an angle of $\tan^{-1}(dy/dx)$ (dx and dy are integers) about each pixel inside the current block.

According to another aspect of the exemplary embodiment, there is provided an apparatus for decoding an image, the apparatus including: an entropy decoder for extracting information about an intra prediction mode applied to a current block to be decoded from a bitstream; and an intra prediction performer for performing intra prediction on the current block according to the intra prediction mode, wherein the intra prediction mode comprises a prediction mode for performing prediction by using an extended line having an angle of $\tan^{-1}(dy/dx)$ (dx and dy are integers) about each pixel inside the current block.

According to another aspect of the exemplary embodiment, there is provided a computer-readable recording medium having embodied thereon a program for executing the method.

According to another aspect of the exemplary embodiment, there is provided a computer-readable recording medium having embodied thereon a program for executing the method.

According to the exemplary embodiment, image compression efficiency may be improved by performing intra prediction encoding in various directions on coding units having various sizes.

BRIEF DESCRIPTION OF THE DRAWINGS

The above and other features of the exemplary embodiment will become more apparent by describing in detail exemplary embodiments thereof with reference to the attached drawings in which:

FIG. 14 illustrates a number of intra prediction modes according to a size of a coding unit, according to an exemplary embodiment;

DETAILED DESCRIPTION

Hereinafter, the exemplary embodiments will be described more fully with reference to the accompanying drawings, in which exemplary embodiments are shown.

In the present specification, a 'coding unit' is an encoding data unit in which image data is encoded at an encoder side and an encoded data unit in which the encoded image data is decoded at a decoder side, according to exemplary embodiments. Also, a 'coded depth' means a depth where a coding unit is encoded. Also, video comprises a still image and moving picture. In the exemplary embodiments, "unit" may or may not refer to a unit of size, depending on its context.

Firstly, a method and apparatus for encoding video and a method and apparatus for decoding video, according to an exemplary embodiment, will be described with reference to FIGS. 1 to 13.

Figure 1:
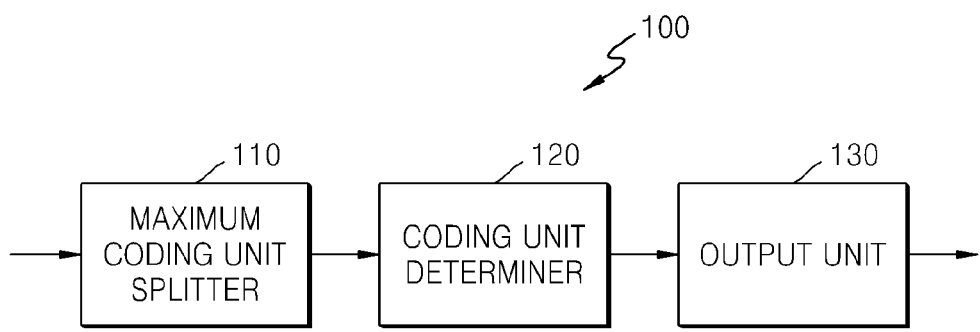
FIG. 1 is a block diagram of an apparatus for encoding a video, according to an exemplary embodiment.

FIG. 1 is a block diagram of an apparatus 100 for encoding a video, according to an exemplary embodiment.

The apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and height in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens or increases, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selects a depth having the least encoding error. Thus, the encoded image data of the coding unit corresponding to the determined coded depth are finally output. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units corresponding to same depth in one maximum coding unit, each of the coding units corresponding to the same depth may be split to a lower depth by measuring an encoding error of the image data of the each coding unit, separately. Accordingly, even when image data is included in one maximum coding unit, the image data is split to regions according to the depths, the encoding errors may differ according to regions in the one maximum coding unite, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transform unit'. A transformation depth indicating the number of splitting times to reach the transform unit by splitting the height and width of the coding unit may also be set in the transform unit. For example, in a current coding unit of 2N×2N, a transformation depth may be 0 when the size of a transform unit is also 2N×2N, may be 1 when each of the height and width of the current coding unit is split into two equal parts, totally split into $4^1$ transform units, and the size of the transform unit is thus N×N, and may be 2 when each of the height and width of the current coding unit is split into four equal parts, totally split into $4^2$ transform units and the size of the transform unit is thus N/2×N/2. For example, the transform unit may be set according to a hierarchical tree structure, in which a transform unit of an upper transformation depth is split into four transform units of a lower transformation depth according to the hierarchical characteristics of a transformation depth.

Similarly to the coding unit, the transform unit in the coding unit may be recursively split into smaller sized regions, so that the transform unit may be determined independently in units of regions. Thus, residual data in the coding unit may be divided according to the transformation having the tree structure according to transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transform unit for transformation.

Coding units according to a tree structure in a maximum coding unit and a method of determining a partition, according to exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transform unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transform units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into SPS (Sequence Parameter Set) or a header of a bitstream.

In the apparatus 100, the deeper coding unit may be a coding unit obtained by dividing a height or width of a coding unit of an upper depth by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the apparatus 100, image compression efficiency may be increased since a coding unit is adjusted while considering characteristics of an image while increasing a maximum size of a coding unit while considering a size of the image.

Figure 2:
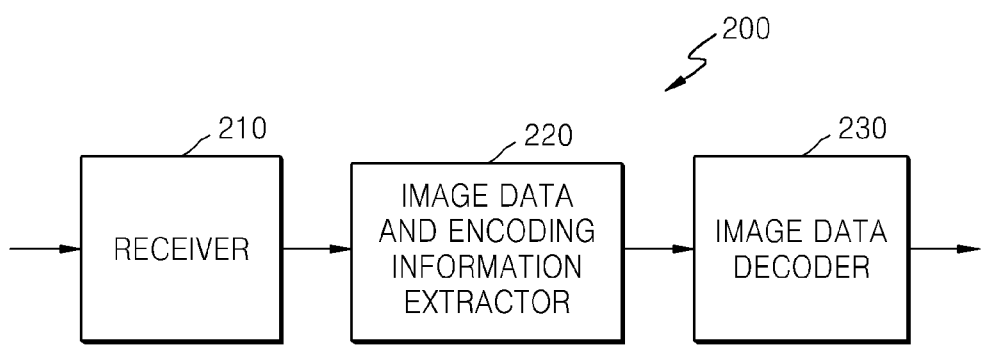
FIG. 2 is a block diagram of an apparatus for decoding a video, according to an exemplary embodiment.

FIG. 2 is a block diagram of an apparatus 200 for decoding a video, according to an exemplary embodiment.

The apparatus 200 includes a receiver 210, an image data and encoding information extractor 220, and an image data decoder 230. Definitions of various terms, such as a coding unit, a depth, a prediction unit, a transform unit, and information about various encoding modes, for various operations of the apparatus 200 are identical to those described with reference to FIG. 1 and the apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transform unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the apparatus 100, repeatedly performs encoding for each deeper coding unit according to depths according to each maximum coding unit. Accordingly, the apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transform unit for each coding unit from among the coding units having the tree structure included in each maximum coding unit. A decoding process may include a prediction including intra prediction and motion compensation, and a inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transform unit in the coding unit, based on the information about the size of the transform unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transform unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and a amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transform unit, according to an exemplary embodiment, will now be described with reference to FIGS. 3 through 13.

Figure 3:
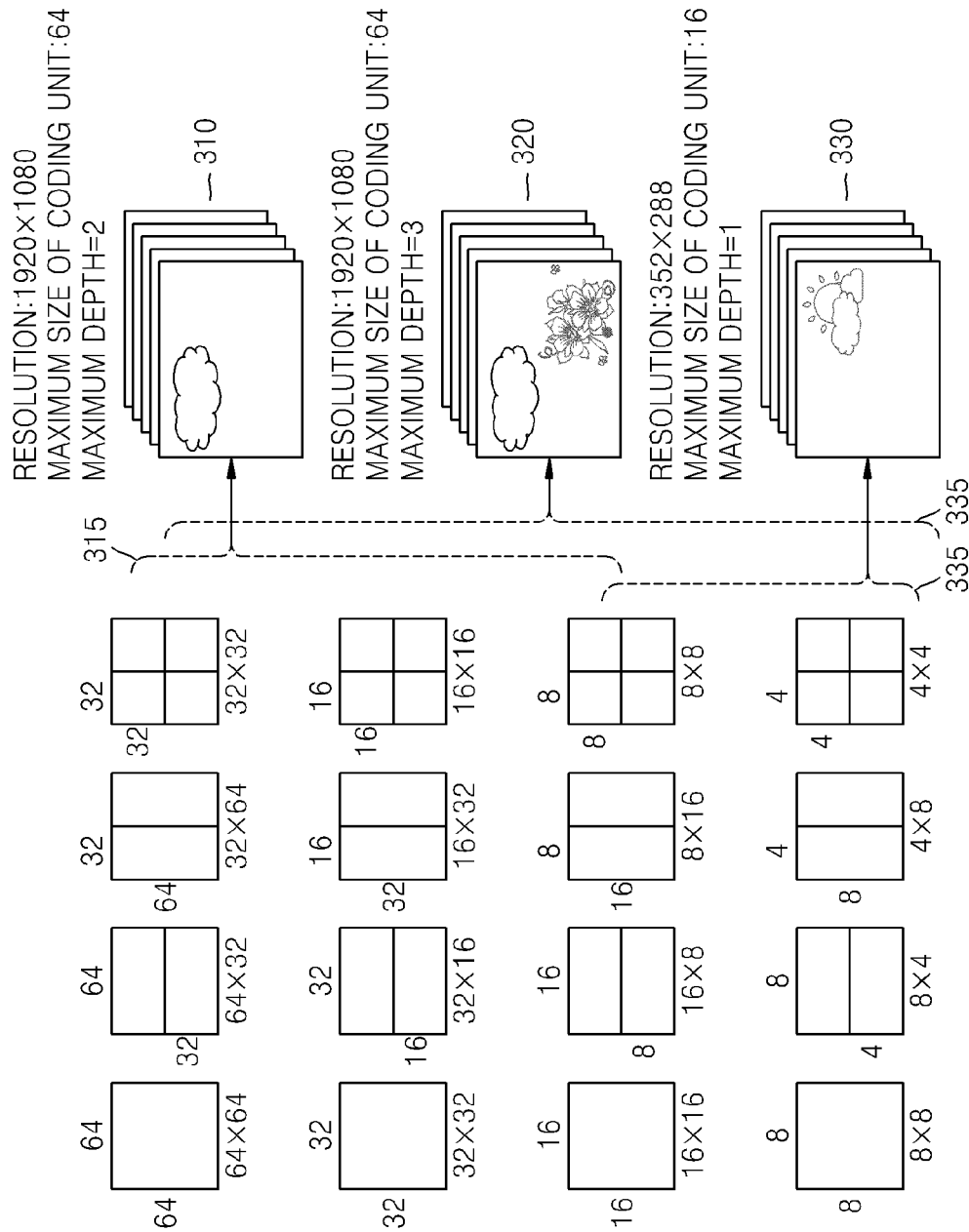
FIG. 3 is a diagram for explaining a concept of coding units according to an exemplary embodiment.

FIG. 3 is a diagram for explaining a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
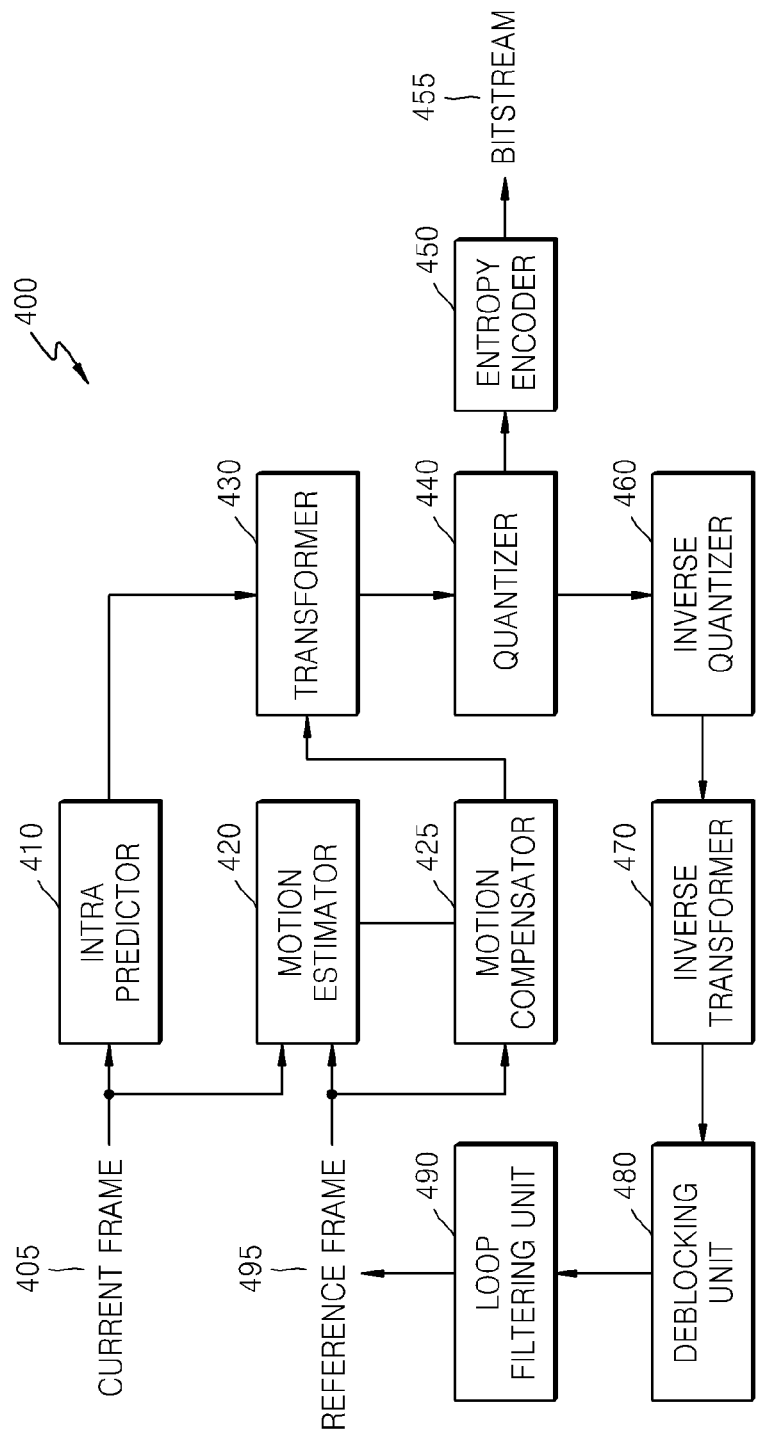
FIG. 4 is a block diagram of an image encoder based on coding units according to an exemplary embodiment.

FIG. 4 is a block diagram of an image encoder 400 based on coding units, according to an exemplary embodiment.

The image encoder 400 performs operations of the coding unit determiner 120 of the apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transform unit in each coding unit from among the coding units having a tree structure.

Figure 5:
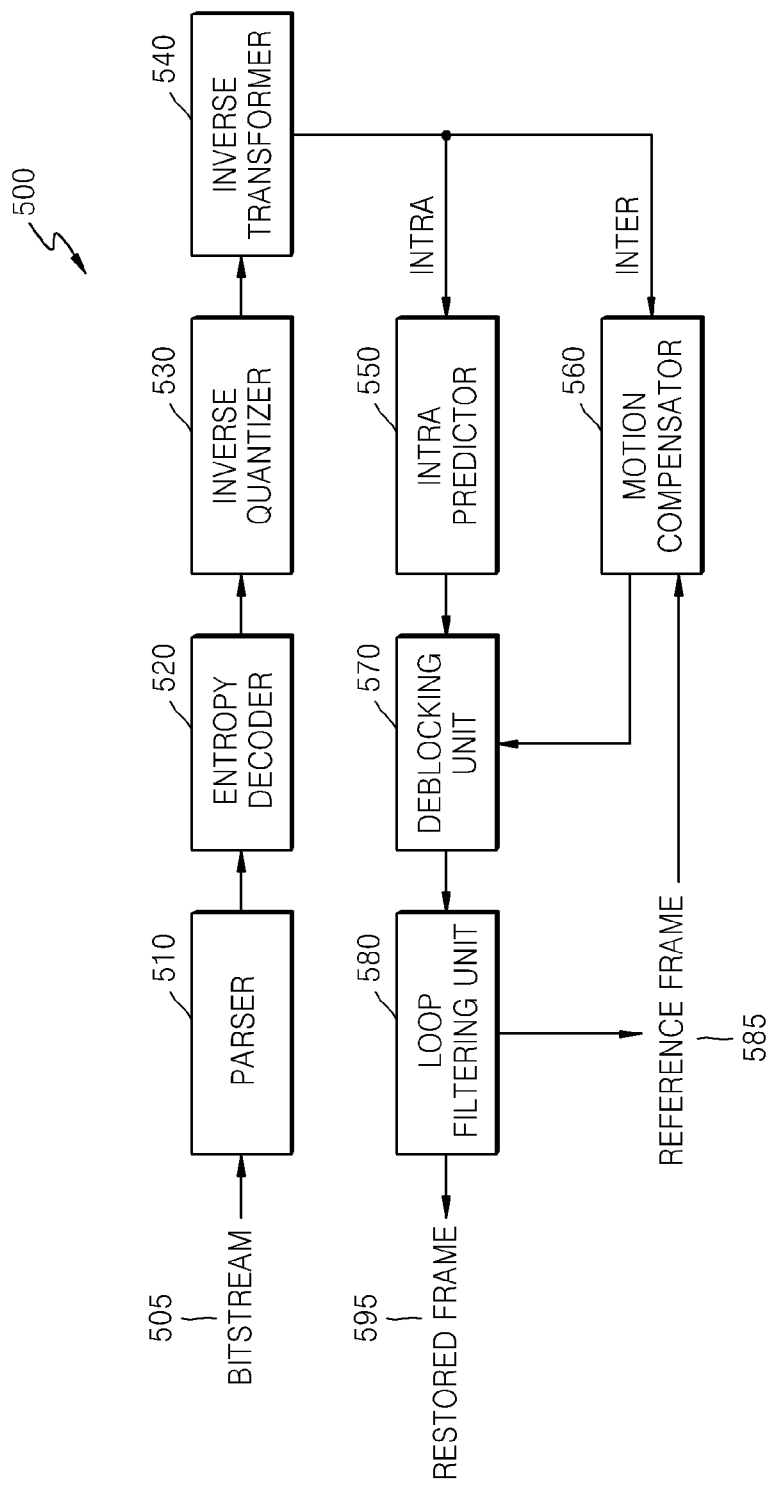
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the apparatus 200, the image decoder 500 may perform operations that are performed after the parser 510.

In order for the image decoder 500 to be applied in the apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transform unit for each coding unit.

Figure 6:
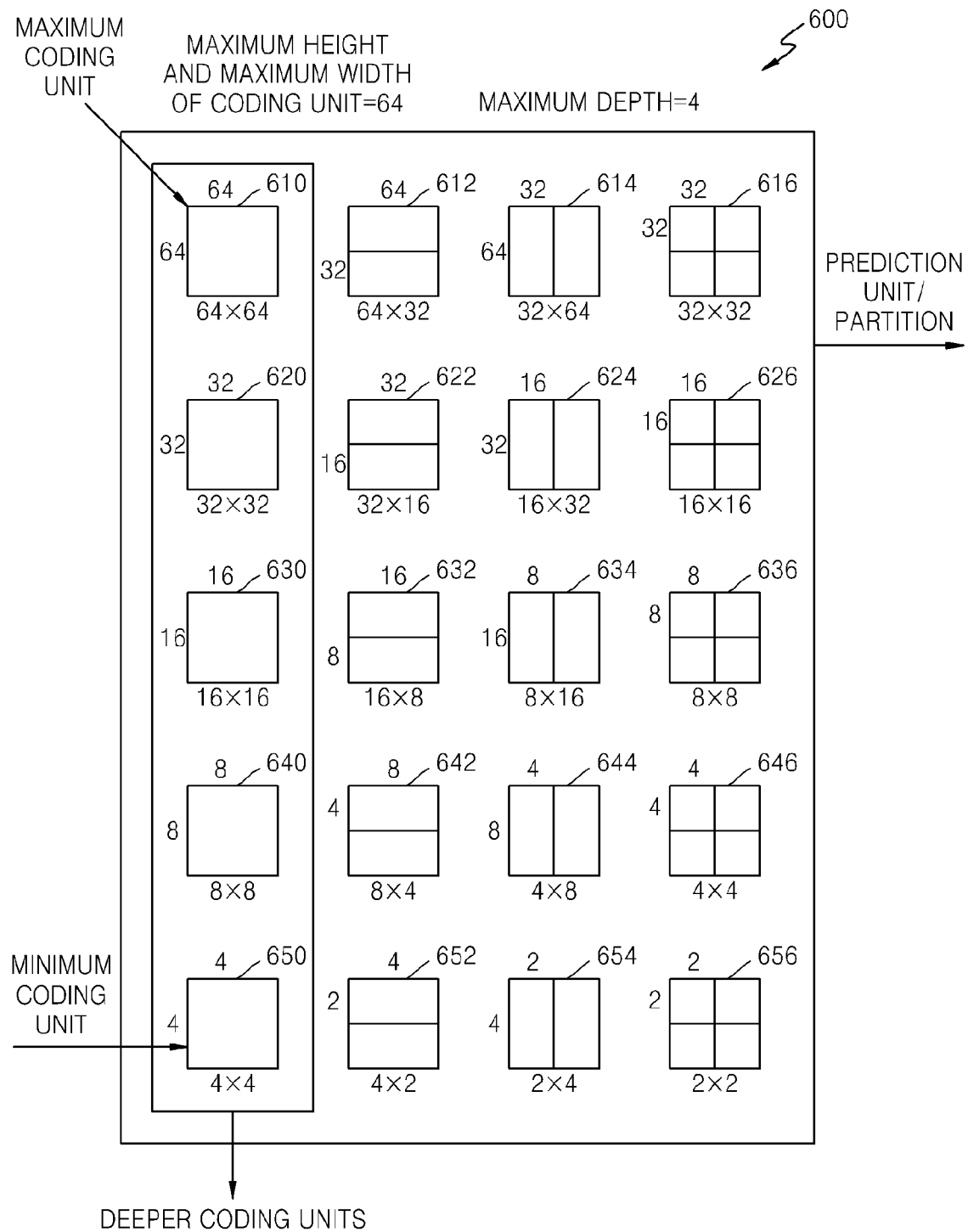
FIG. 6 is a diagram illustrating deeper coding units according to depths, and partitions according to an exemplary embodiment.

FIG. 6 is a diagram illustrating deeper coding units according to depths, and partitions, according to an exemplary embodiment.

The apparatus 100 and the apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depth, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 7:
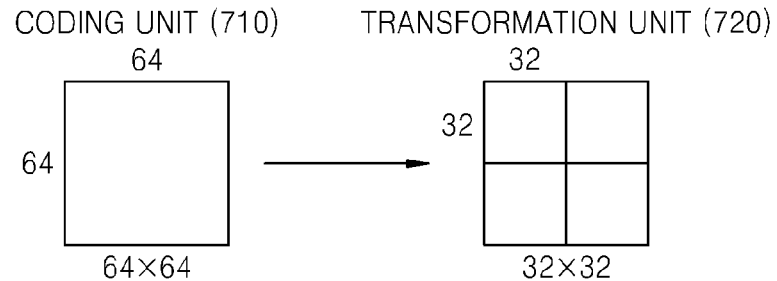
FIG. 7 is a diagram for explaining a relationship between a coding unit and transform units, according to an exemplary embodiment.

FIG. 7 is a diagram for explaining a relationship between a coding unit 710 and transform units 720, according to an exemplary embodiment.

The apparatus 100 or 200 encodes or decodes an image according to coding units having sizes smaller than or equal to a maximum coding unit for each maximum coding unit. Sizes of transform units for transformation during encoding may be selected based on data units that are not larger than corresponding coding unit.

For example, in the apparatus 100 or 200, if a size of the coding unit 710 is 64×64, transformation may be performed by using the transform units 720 having a size of 32×32.

Also, data of the coding unit 710 having the size of 64×64 may be encoded by performing the transformation on each of the transform units having the size of 32×32, 16×16, 8×8, and 4×4, which are smaller than 64×64, and then a transform unit having the least coding error may be selected.

Figure 8:
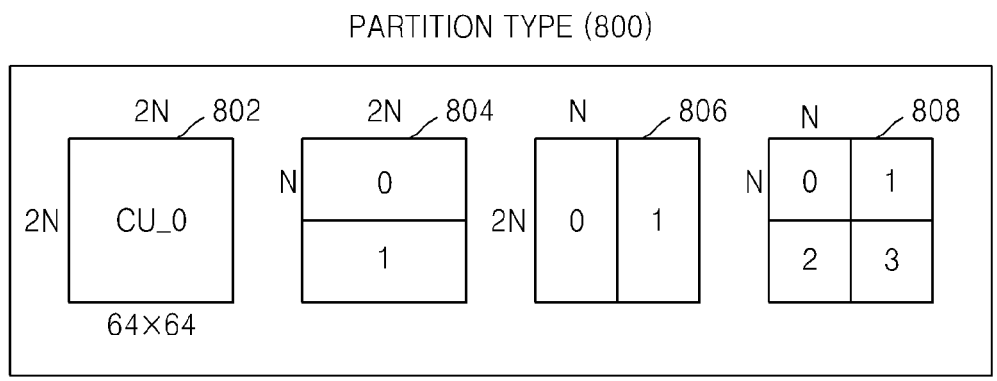
FIG. 8 is a diagram for explaining encoding information of coding units corresponding to a coded depth, according to an exemplary embodiment.
Figure 8:
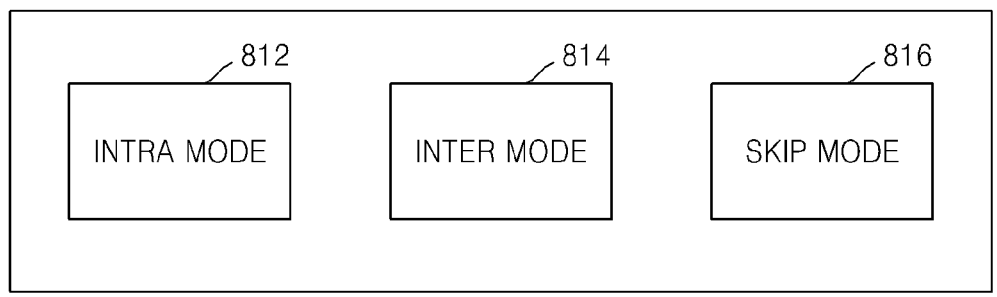
Figure 8:
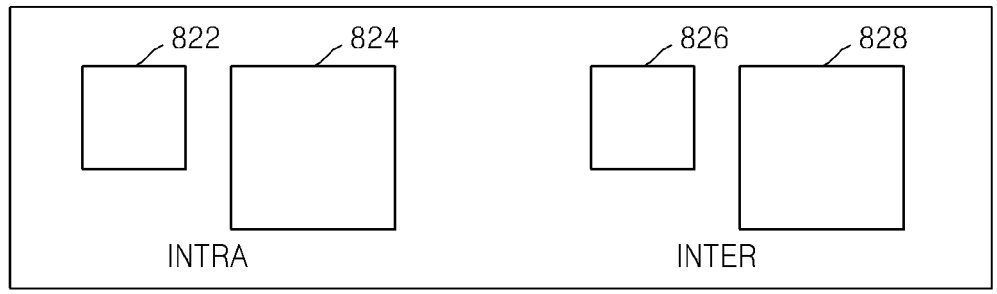

FIG. 8 is a diagram for explaining encoding information of coding units corresponding to a coded depth, according to an exemplary embodiment.

The output unit 130 of the apparatus 100 may encode and transmit information 800 about a partition type, information 810 about a prediction mode, and information 820 about a size of a transform unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transform unit to be based on when transformation is performed on a current coding unit. For example, the transform unit may be a first intra transform unit 822, a second intra transform unit 824, a first inter transform unit 826, or a second intra transform unit 828.

The image data and encoding information extractor 220 of the apparatus 200 may extract and use the information 800, 810, and 820 for decoding.

Figure 9:
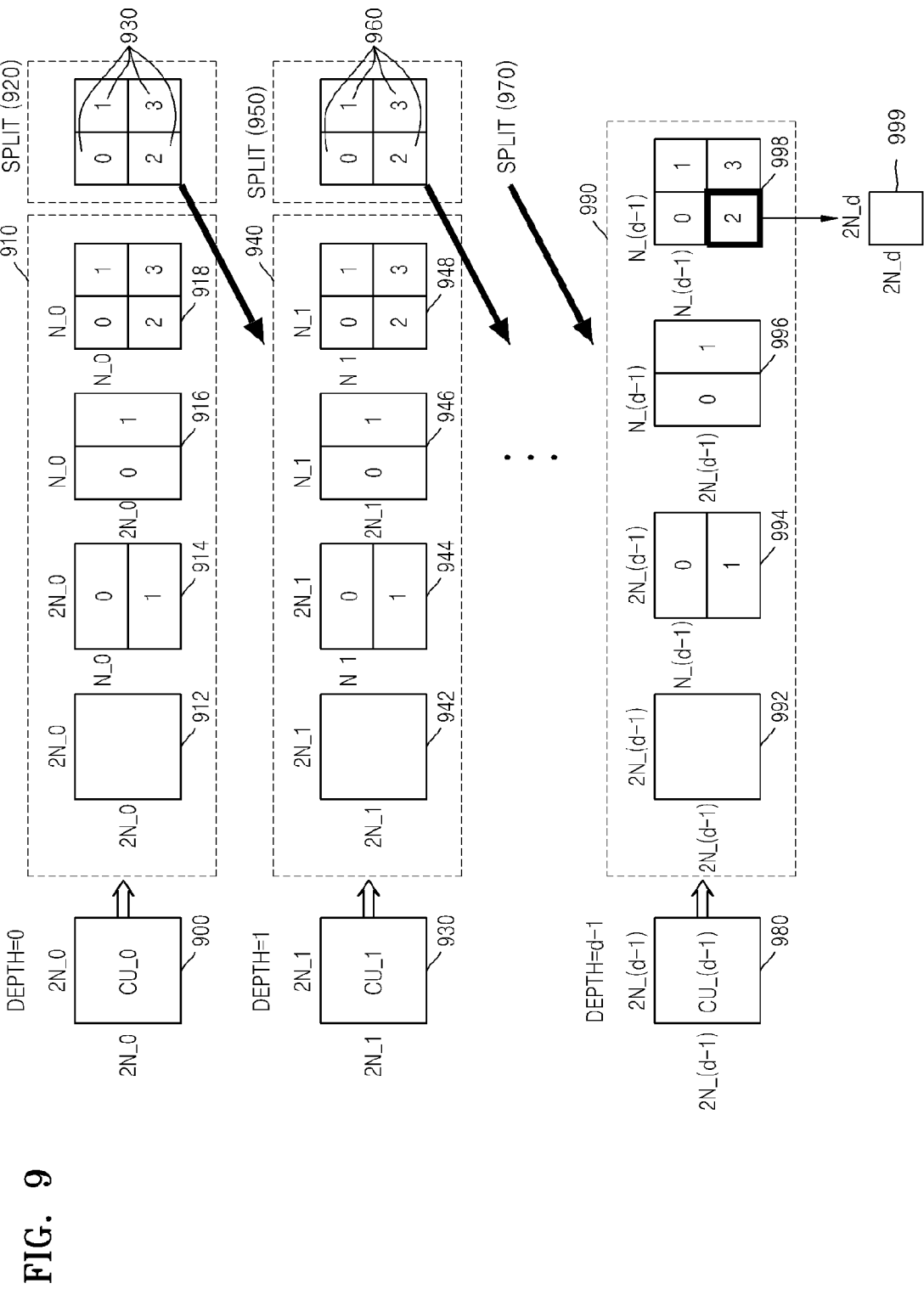
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the coding unit 900 may be determined to be N_(d−1)×N_(d−1). Also, since the maximum depth is d and a minimum coding unit 980 having a lowermost depth of d−1 is no longer split to a lower depth, split information for a coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the apparatus 200 may extract and use the information about the coded depth and the prediction unit of the coding unit 900 to decode the partition 912. The apparatus 200 may determine a depth, in which split information is 0, as a coded depth by using split information according to depths, and use information about an encoding mode of the corresponding depth for decoding.

Figure 10:
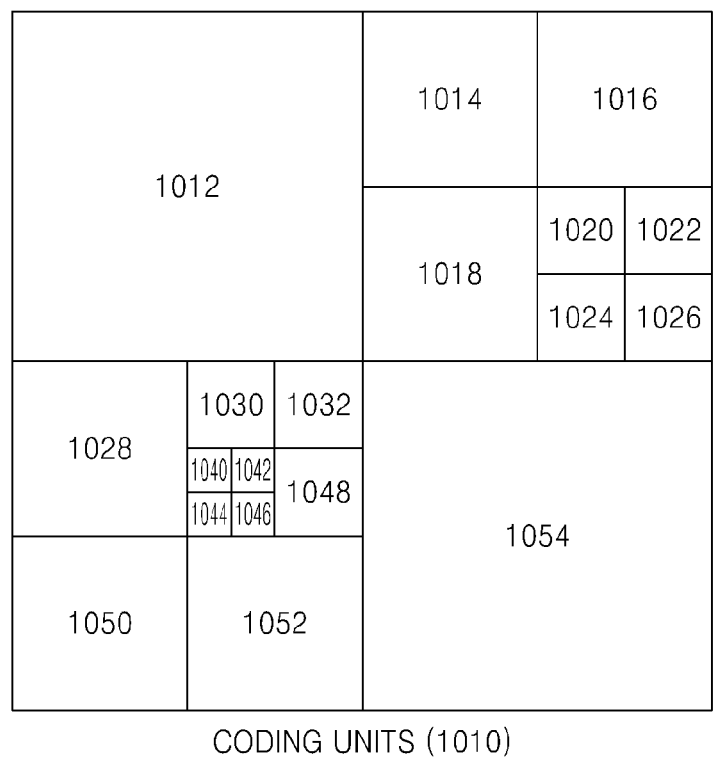
FIGS. 10 through 12 are diagrams for explaining a relationship between coding units, prediction units, and transform units, according to an exemplary embodiment.
Figure 11:
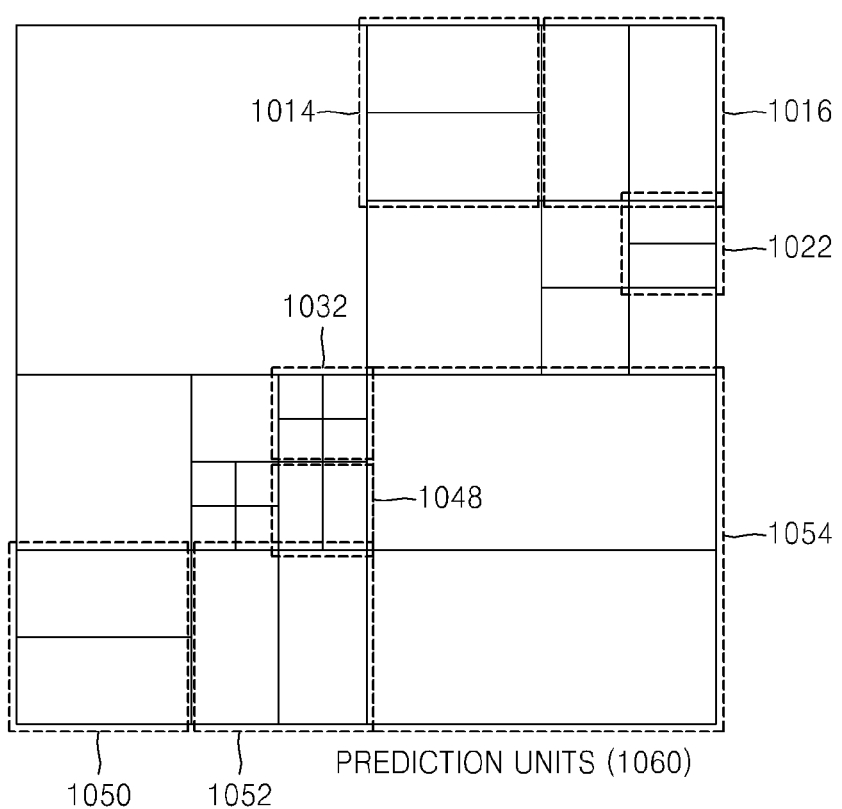
Figure 12:
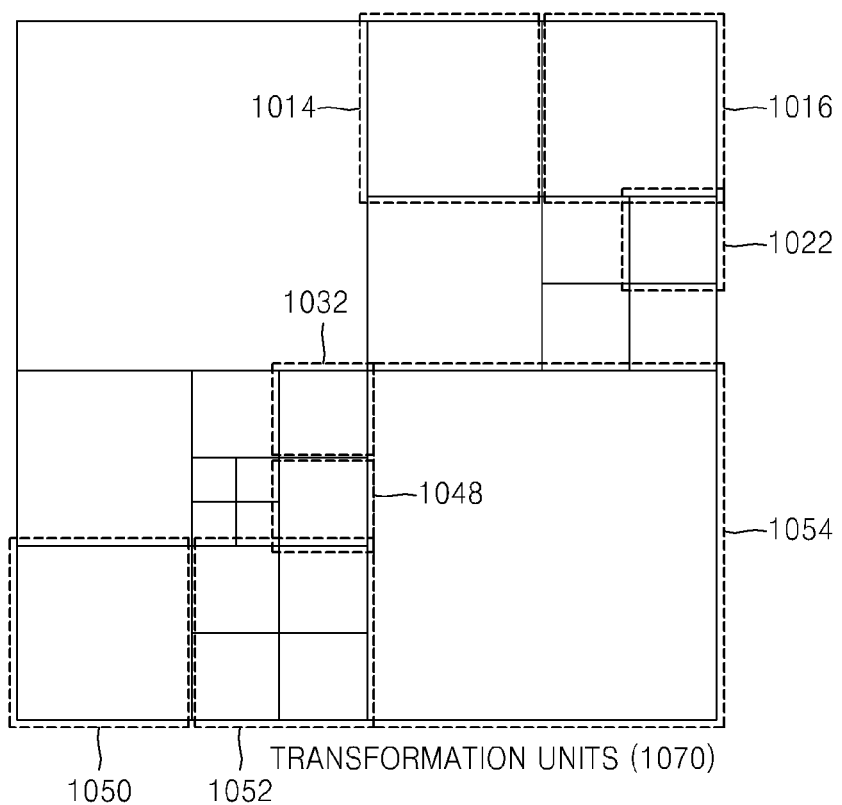

FIGS. 10 through 12 are diagrams for explaining a relationship between coding units 1010, prediction units 1060, and transform units 1070, according to an exemplary embodiment.

The coding units 1010 are coding units having a tree structure, corresponding to coded depths determined by the apparatus 100, in a maximum coding unit. The prediction units 1060 are partitions of prediction units of each of the coding units 1010, and the transform units 1070 are transform units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are split into partitions for prediction encoding. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transform units 1070 in a data unit that is smaller than the coding unit 1052. Also, the coding units 1014, 1016, 1022, 1032, 1048, 1050, and 1052 in the transform units 1070 are different from those in the prediction units 1060 in terms of sizes and shapes. In other words, the apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transform unit. Table 1 shows the encoding information that may be set by the apparatuses 100 and 200.

TABLE 1

| Split Information 0 (Encoding on Coding unit having Size of 2N × 2N and Current Depth of d) | | | | | Split Information 1 |
| --- | --- | --- | --- | --- | --- |
| Prediction Mode | Partition Type | | Size of Transform Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transform Unit | Split Information 1 of Transform Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the apparatus 100 may output the encoding information about the coding units having a tree structure, and the image data and encoding information extractor 220 of the apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transform unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transform unit may be set to be two types in the intra mode and two types in the inter mode. In other words, if split information of the transform unit is 0, the size of the transform unit may be 2N×2N, which is the size of the current coding unit. If split information of the transform unit is 1, the transform units may be obtained by splitting the current coding unit. Also, if a partition type of the current coding unit having the size of 2N×2N is a symmetrical partition type, a size of a transform unit may be N×N, and if the partition type of the current coding unit is an asymmetrical partition type, the size of the transform unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper encoding units adjacent to the current coding unit may be directly referred to and used.

Alternatively, if a current coding unit is predicted based on encoding information of adjacent data units, data units adjacent to the current coding unit are searched using encoding information of the data units, and the searched adjacent coding units may be referred for predicting the current coding unit.

Figure 13:
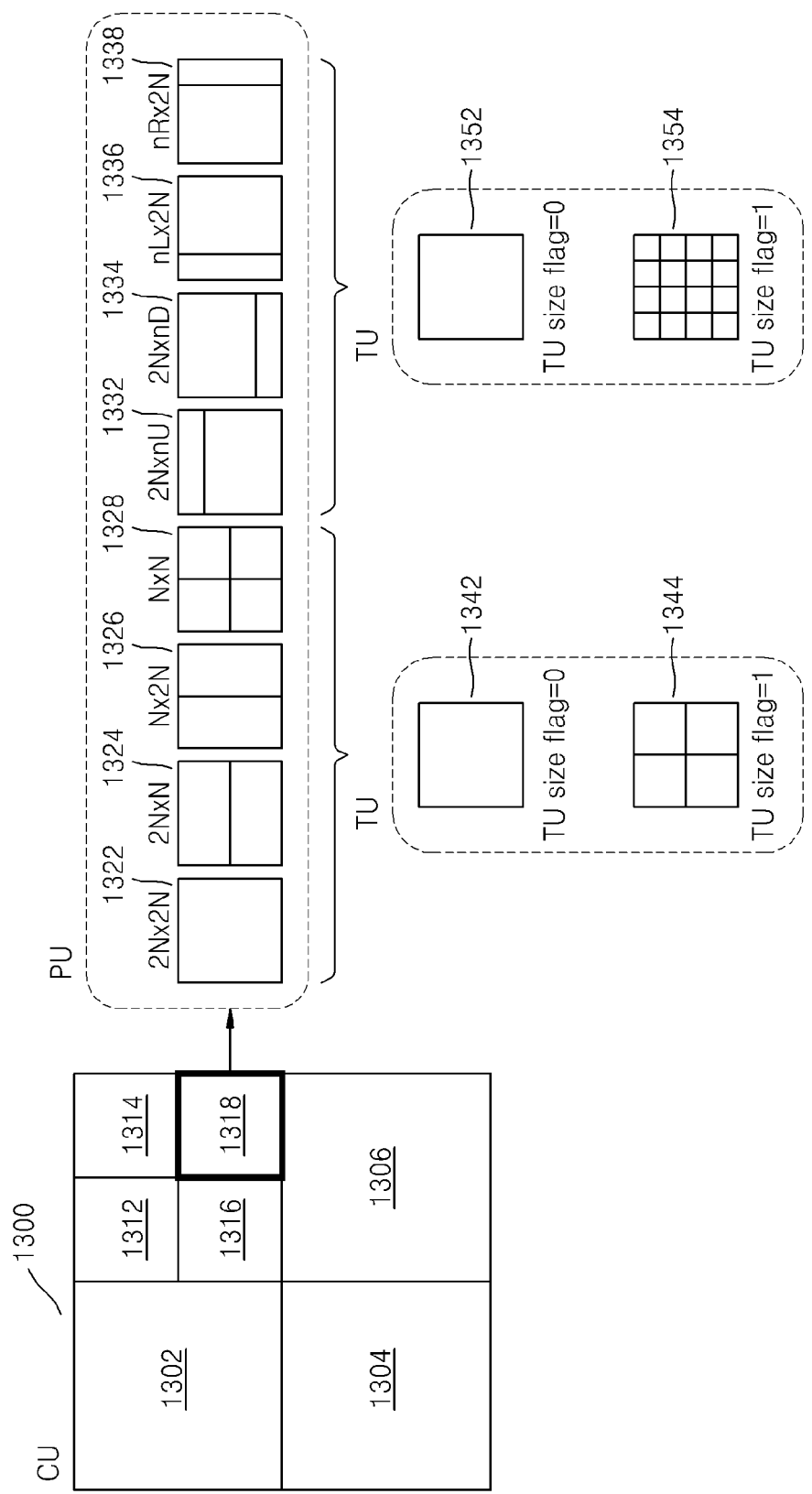
FIG. 13 is a diagram for explaining a relationship between a coding unit, a prediction unit or a partition, and a transform unit, according to encoding mode information of Table 1.

FIG. 13 is a diagram for explaining a relationship between a coding unit, a prediction unit or a partition, and a transform unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transform unit 1342 having a size of 2N×2N is set if split information (TU size flag) of a transform unit is 0, and a transform unit 1344 having a size of N×N is set if a TU size flag is 1.

When the partition type is set to be asymmetrical, i.e., the partition type 1332, 1334, 1336, or 1338, a transform unit 1352 having a size of 2N×2N is set if a TU size flag is 0, and a transform unit 1354 having a size of N/2×N/2 is set if a TU size flag is 1.

Referring to FIG. 13, the TU size flag is a flag having a value or 0 or 1, but the TU size flag is not limited to 1 bit, and a transform unit may be hierarchically split having a tree structure while the TU size flag increases from 0.

In this case, the size of a transform unit that has been actually used may be expressed by using a TU size flag of a transform unit, according to an exemplary embodiment, together with a maximum size and minimum size of the transform unit. According to an exemplary embodiment, the apparatus 100 is capable of encoding maximum transform unit size information, minimum transform unit size information, and a maximum TU size flag. The result of encoding the maximum transform unit size information, the minimum transform unit size information, and the maximum TU size flag may be inserted into an SPS. According to an exemplary embodiment, the apparatus 200 may decode video by using the maximum transform unit size information, the minimum transform unit size information, and the maximum TU size flag.

Intra prediction performed by the intra prediction unit 410 of the video encoding apparatus 100 illustrated in FIG. 4 and the intra prediction unit 550 of the video decoding apparatus 200 illustrated in FIG. 5 will now be described in detail. In the following description, an encoding unit denotes a current encoded block in an encoding process of an image, and a decoding unit denotes a current decoded block in a decoding process of an image. The encoding unit and the decoding unit are different only in that the encoding unit is used in the encoding process and the decoding unit is used in the decoding. For the consistency of terms, except for a particular case, the encoding unit and the decoding unit are referred to as a coding unit in both the encoding and decoding processes. Also, one of ordinary skill in the art would understand by the present specification that an intra prediction method and apparatus according to an exemplary embodiment may also be applied to perform intra prediction in a general video codec.

FIG. 14 illustrates a number of intra prediction modes according to a size of a coding unit, according to an exemplary embodiment.

In FIG. 14, a number of intra prediction modes to be applied to a coding unit (a decoding unit in a decoding step)

may vary according to a size of the coding unit. For example, referring to FIG. 14, when a size of a coding unit to be intra-predicted is N×N, numbers of intra prediction modes to be actually performed on coding units having sizes of 2×2, 4×4, 16×16, 32×32, 64×64, and 128×128 may be set to be 5, 9, 9, 17, 33, 5, and 5 (in the case of Example 2). For another example, when a size of a coding unit to be intra-predicted is N×N, numbers of intra prediction modes to be actually performed on coding units having sizes of 2×2, 4×4, 8×8, 16×16, 32×32, 64×64, and 128×128 may be set to be 3, 17, 34, 34, 34, 5, and 5. The reason why a number of intra prediction modes to be performed varies according to a size of a coding unit is that overhead for encoding prediction mode information varies according to the size of the coding unit. In other words, in the case of a coding unit having a small size, although it occupies a small part of an entire image, overhead for transmitting additional information such as a prediction mode of the coding unit having the small size may be high. Accordingly, if the coding unit having the small size is encoded by using too many prediction modes, the amount of bits may be increased and compression efficiency may be reduced. A coding unit having a large size, for example, a coding unit having a size greater than 64×64, is often selected as a coding unit for a flat area. If the coding unit having the large size is encoded by using too many prediction modes, however, compression efficiency may also be reduced.

Accordingly, in FIG. 14, if sizes of coding units are roughly classified into at least three sizes N1×N1 (2≤N1≤4, N1 is an integer), N2×N2 (8≤N2≤32, N2 is an integer), and N3×N3 (64≤N3, N3 is an integer), a number of intra prediction modes to be performed on the coding unit having the size of N1×N1 is A1 (A1 is a positive integer), a number of intra prediction modes to be performed on the coding unit having the size of N2×N2 is A2 (A2 is a positive integer), and a number of intra prediction modes to be performed on the coding unit having the size of N3×N3 is A3 (A3 is a positive integer), a number of intra prediction modes to be performed according to a size of each coding unit may be set to satisfy a relationship of A3≤A1≤A2. That is, when a current picture is roughly divided into a coding unit having a small size, a coding unit having an intermediate size, and a coding unit having a large size, the coding unit having the intermediate size may be set to have a greatest number of prediction modes, and the coding unit having the small size and the coding unit having the large size may be set to have a relatively smaller number of prediction modes. However, the present exemplary embodiment is not limited thereto, and the coding unit having the small size and the coding unit having the large size may be set to have a great number of prediction modes. A number of prediction modes varying according to a size of each coding unit illustrated in FIG. 14 is an example, and may be changed.

Figures 15A, 15B:
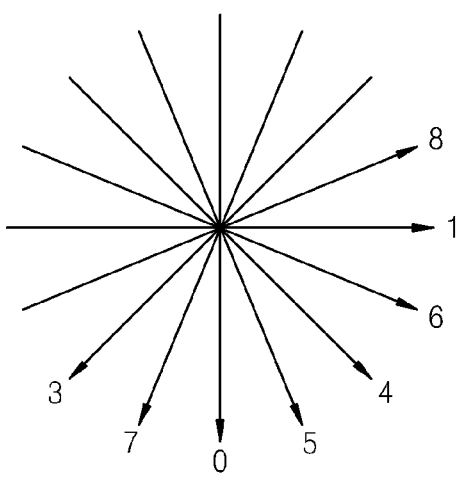
FIGS. 15A through 15C are diagrams for explaining an intra prediction mode applied to a coding unit having a predetermined size, according to an exemplary embodiment.

FIG. 15A is a diagram for explaining an intra prediction mode applied to a coding unit having a predetermined size, according to an exemplary embodiment.

Referring to FIGS. 14 and 15A, for example, when intra prediction is performed on a coding unit having a size of 4×4, the coding unit having the size of 4×4 may have a vertical mode (mode 0), a horizontal mode (mode 1), a direct current (DC) mode (mode 2), a diagonal down left mode (mode 3), a diagonal down right mode (mode 4), a vertical right mode (mode 5), a horizontal down mode (mode 6), a vertical left mode (mode 7), and a horizontal up mode (mode 8).

FIG. 15B illustrates directions of the intra prediction modes of FIG. 15A. In FIG. 15B, a numeral shown at an end of an arrow denotes a corresponding mode value when prediction is performed in a direction marked by the arrow. Here, the mode 2 is a DC prediction mode with no directivity and thus is not shown.

Figure 15C:
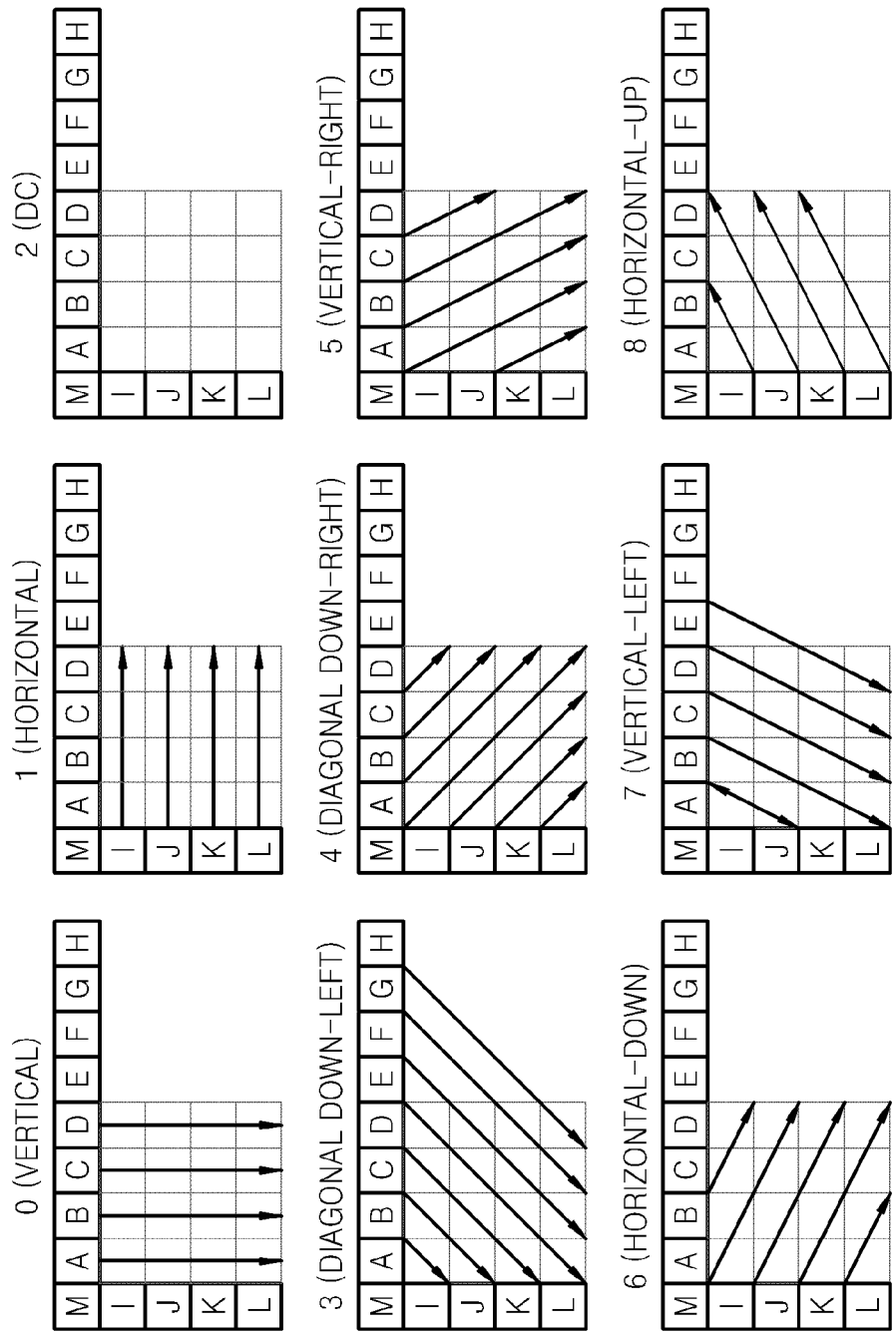

FIG. 15C illustrates an intra prediction method performed on the coding unit of FIG. 15A.

Referring to FIG. 15C, a prediction coding unit is generated by using neighboring pixels A-M of a current coding unit in an available intra prediction mode determined by a size of a coding unit. For example, an operation of prediction-encoding a current coding unit having a size of 4×4 in the mode 0, that is, the vertical mode, will now be explained. First, pixel values of pixels A through D adjacent above the current coding unit having the size of 4×4 are predicted to be pixel values of the current coding unit having the size of 4×4. That is, a pixel value of the pixel A is predicted to be pixel values of four pixels of a first column of the current coding unit having the size of 4×4, a value of the pixel B is predicted to be pixel values of four pixels of a second column of the current coding unit having the size of 4×4, a value of the pixel C is predicted to be pixel values of four pixels of a third column of the current coding unit having the size of 4×4, and a value of the pixel D is predicted to be pixel values of four pixels of a fourth column of the current coding unit having the size of 4×4. Next, an error value between actual pixel values of pixels included in the original 4×4 current coding unit and pixel values of pixels included in the 4×4 current coding unit predicted using the pixels A through D is obtained and encoded.

Figure 16:
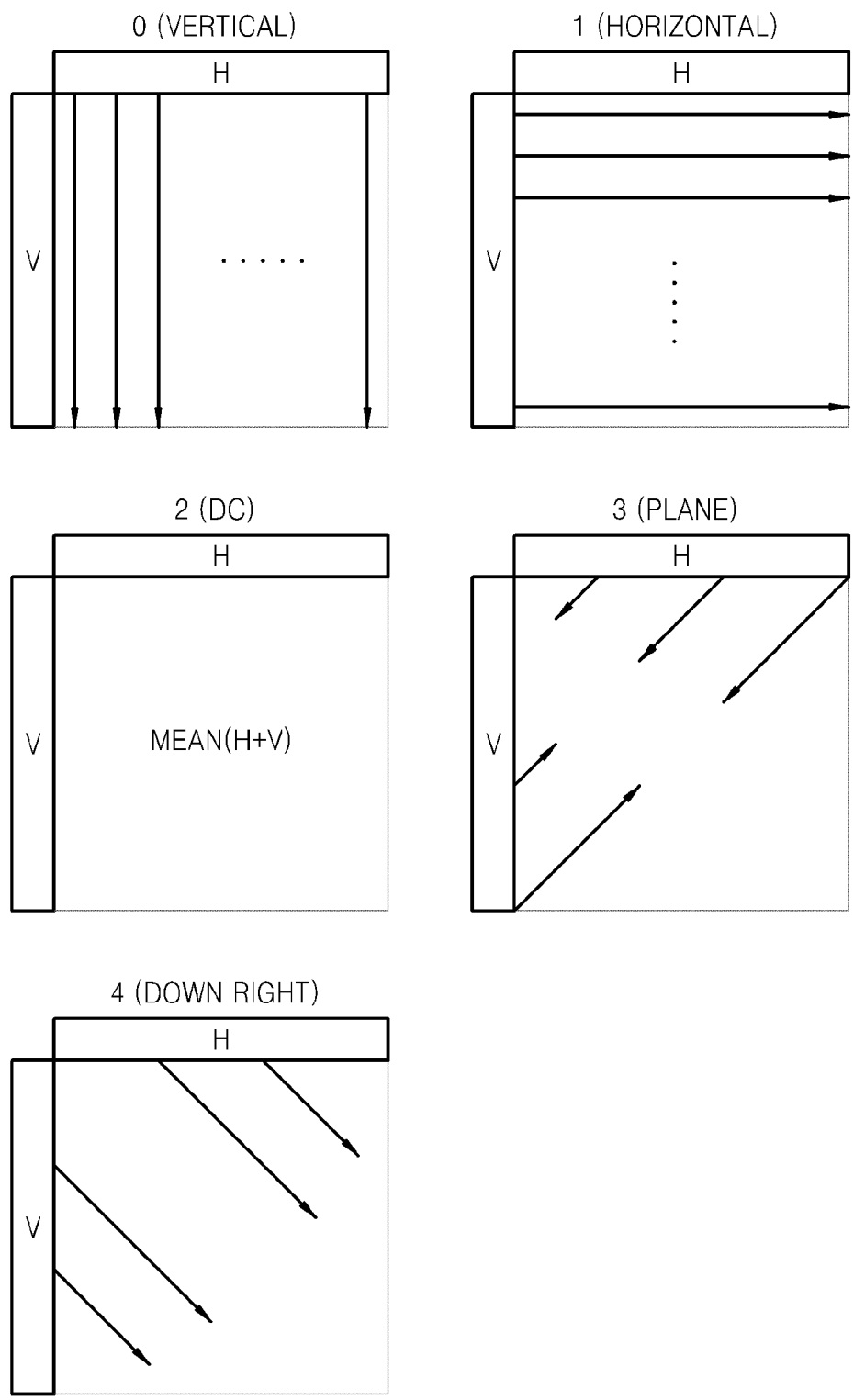
FIG. 16 is a diagram for explaining an intra prediction mode applied to a coding unit having a predetermined size, according to another exemplary embodiment.

FIG. 16 is a diagram for explaining an intra prediction mode applied to a coding unit having a predetermined size, according to another exemplary embodiment.

Referring to FIGS. 14 and 16, when intra prediction is performed on a coding unit having a size of 2×2, the coding unit having the size of 2×2 may have 5 modes, that is, a vertical mode, a horizontal mode, a DC mode, a plane mode, and a diagonal down right mode.

If a coding unit having a size of 32×32 has 33 intra prediction modes as shown in FIG. 14, it is necessary to set directions of the 33 intra prediction modes. In order to set intra prediction modes having various directions other than the intra prediction modes illustrated in FIGS. 15 and 16, a prediction direction for selecting a neighboring pixel to be used as a reference pixel about a pixel in a coding unit is set by using dx and dy parameters. For example, when each of the 33 prediction modes is represented as a mode N (N is an integer from 0 to 32), a mode 0 may be set to be a vertical mode, a mode 1 is set to be a horizontal mode, a mode 2 is set to be a DC mode, and a mode 3 is set to be a plane mode, and each of a mode 4 through a mode 31 may be set to be a prediction mode having a directivity of $\tan^{-1}(dy/dx)$ by using (dx, dy) represented as one of (1,−1), (1,1), (1,2), (2,1), (1,−2), (2,1), (1,−2), (2,−1), (2,−11), (5,−7), (10,−7), (11,3), (4,3), (1,11), (1,−1), (12,−3), (1,−11), (1,−7), (3,−10), (5,−6), (7,−6), (7,−4), (11,1), (6,1), (8,3), (5,3), (5,7), (2,7), (5,−7), and (4,−3) as shown in Table 2.

TABLE 2

| mode # | dx | dy | mode # | dx | Dy |
| --- | --- | --- | --- | --- | --- |
| mode 4 | 1 | −1 | mode 18 | 1 | −11 |
| mode 5 | 1 | 1 | mode 19 | 1 | −7 |
| mode 6 | 1 | 2 | mode 20 | 3 | −10 |
| mode 7 | 2 | 1 | mode 21 | 5 | −6 |
| mode 8 | 1 | −2 | mode 22 | 7 | −6 |
| mode 9 | 2 | −1 | mode 23 | 7 | −4 |
| mode 10 | 2 | −11 | mode 24 | 11 | 1 |
| mode 11 | 5 | −7 | mode 25 | 6 | 1 |
| mode 12 | 10 | −7 | mode 26 | 8 | 3 |

TABLE 2-continued

| mode # | dx | dy | mode # | dx | Dy |
|---|---|---|---|---|---|
| mode 13 | 11 | 3 | mode 27 | 5 | 3 |
| mode 14 | 4 | 3 | mode 28 | 5 | 7 |
| mode 15 | 1 | 11 | mode 29 | 2 | 7 |
| mode 16 | 1 | −1 | mode 30 | 5 | −7 |
| mode 17 | 12 | −3 | mode 31 | 4 | −3 |

The mode 0 is a vertical mode, the mode 1 is a horizontal mode, the mode 2 is a DC mode, the mode 3 is a plane mode, and the mode 32 is a bilinear mode.

A last mode 32 may be set to be a bilinear mode using bilinear interpolation as will be described with reference to FIG. 18.

Figure 17A:
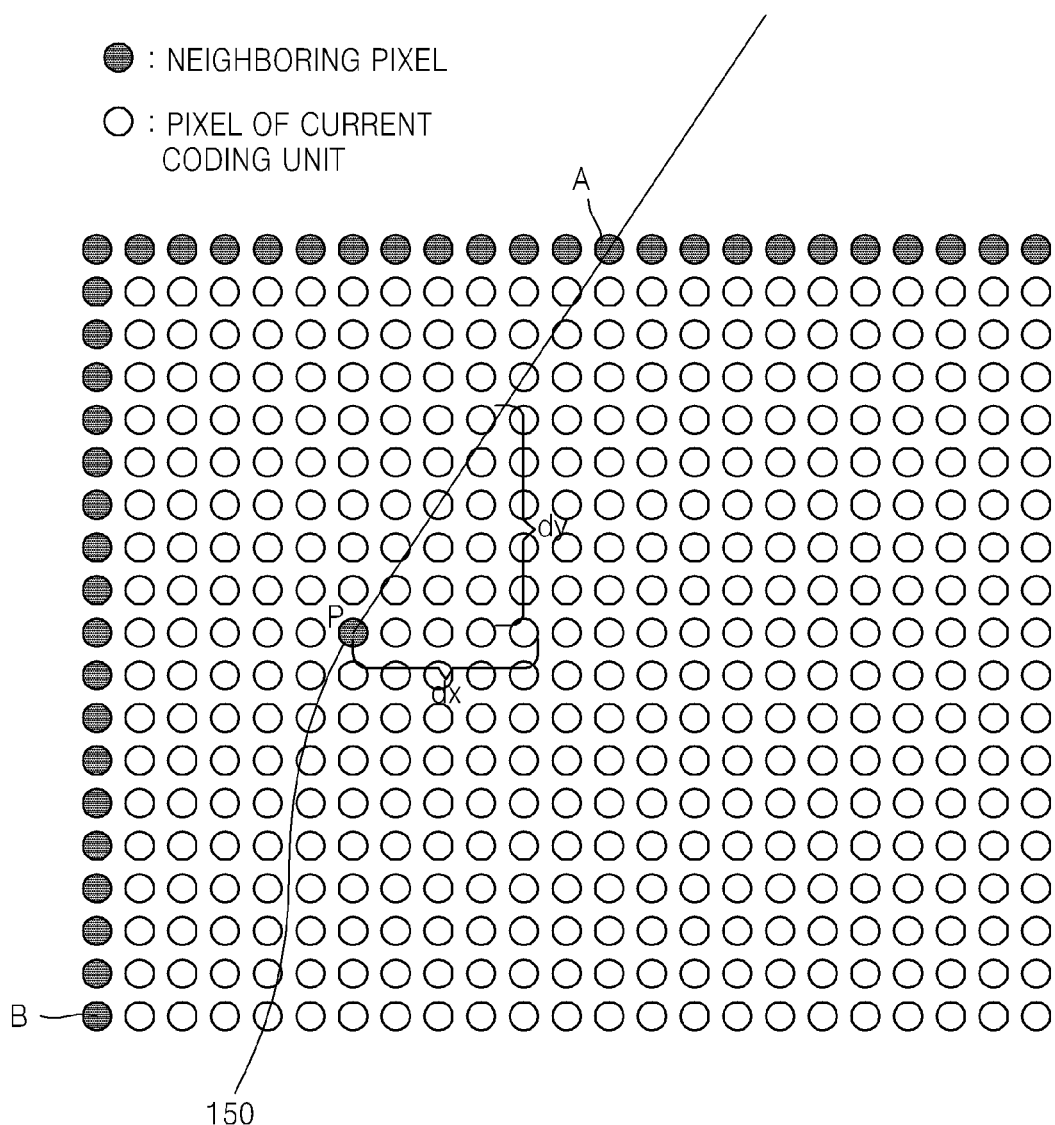
FIGS. 17A-C are reference diagrams for explaining intra prediction modes having various directivities, according to an exemplary embodiment.
Figure 17B:
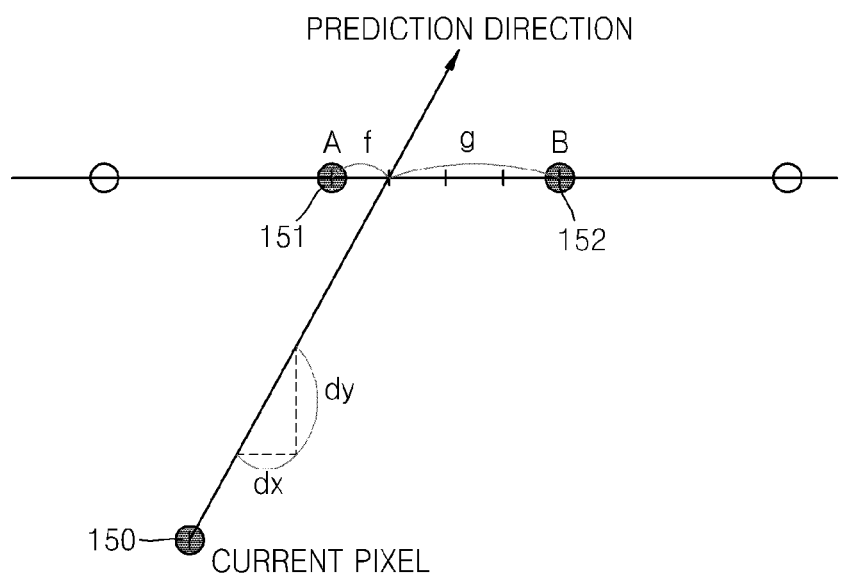
Figure 17C:
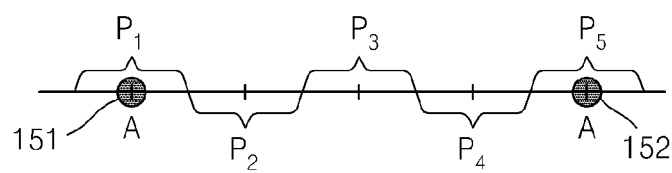

FIGS. 17A through 17C are reference diagrams for explaining intra prediction modes having various directivities, according to an exemplary embodiment.

As described above with reference to Table 2, intra prediction modes may have various directivities of $\tan^{-1}(dy/dx)$ by using a plurality of (dx, dy) parameters.

Referring to FIG. 17A, neighboring pixels A and B located on an extended line 150 having an angle of $\tan^{-1}(dy/dx)$ determined according to (dx, dy) of each mode shown in Table 2 about a current pixel P to be predicted in a current coding unit may be used as a predictor for the current pixel P. In this case, neighboring pixels used as a predictor may be pixels of previous coding units at up, left, right up, and left down sides of a current coding unit, which are previously encoded and restored. Also, if the extended line 150 passes between, not through, neighboring pixels of integer locations, neighboring pixels close to the extended line 150 may be used as a predictor. For example, a neighboring pixel closest to the extended line 150 may be used as a predictor. Also, an average value between neighboring pixels closer to the extended line 150 from among the neighboring pixels may be used as a predictor, or a weighted average value considering a distance between an intersection of the extended line 150 and neighboring pixels close to the extended line 150 may be used as a predictor for the current pixel P. Also, it may be signaled which neighboring pixel between neighboring pixel on X-axis and neighboring pixel Y-axis, like neighboring pixels A and B, is used as a predictor for the current pixel P in every prediction unit.

FIGS. 17B and 17C are reference diagrams for explaining a process of generating a predictor when the extended line 150 of FIG. 17A passes between, not through, neighboring pixels of integer locations.

Referring to FIG. 17B, if the extended line 150 having an angle of $\tan^{-1}(dy/dx)$ that is determined according to (dx, dy) of each mode passes between a neighboring pixel A 151 and a neighboring pixel B 152 of integer locations, a weighted average value considering a distance between an intersection of the extended line 150 and the neighboring pixels A 151 and B 152 close to the extended line 150 may be used as a predictor as described above. For example, if a distance between the neighboring pixel A 151 and the intersection of the extended line 150 having the angle of $\tan^{-1}(dy/dx)$ is f, and a distance between the neighboring pixel B 152 and the intersection of the extended line 150 is g, a predictor for the current pixel P may be obtained as (A*g+B*f)/(f+g). Here, f and g may be each a normalized distance using an integer. If software or hardware is used, the predictor for the current pixel P may be obtained by shift operation as (g*A+f*B+2)>>2. As shown in FIG. 17B, if the extended line 150 passes through a first quarter close to the neighboring pixel A 151 from among four parts obtained by quartering a distance between the neighboring pixel A 151 and the neighboring pixel B 152 of the integer locations, the predictor for the current pixel P may be acquired as (3*A+B)/4. Such operation may be performed by shift operation considering rounding-off to a nearest integer like (3*A+B+2)>>2.

Meanwhile, if the extended line 150 having the angle of $\tan^{-1}(dy/dx)$ that is determined according to (dx, dy) of each mode passes between the neighboring pixel A 151 and the neighboring pixel B 152 of the integer locations, a section between the neighboring pixel A 151 and the neighboring pixel B 152 may be divided into a predetermined number of areas, and a weighted average value considering a distance between an intersection and the neighboring pixel A 151 and the neighboring pixel B 152 in each divided area may be used as a prediction value. For example, referring to FIG. 17C, a section between the neighboring pixel A 151 and the neighboring pixel B 152 may be divided into five sections P1 through P5 as shown in FIG. 17C, a representative weighted average value considering a distance between an intersection and the neighboring pixel A 151 and the neighboring pixel B 152 in each section may be determined, and the representative weighted average value may be used as a predictor for the current pixel P. In detail, if the extended line 150 passes through the section P1, a value of the neighboring pixel A may be determined as a predictor for the current pixel P. If the extended line 150 passes through the section P2, a weighted average value (3*A+1*B+2)>>2 considering a distance between the neighboring pixels A and B and a middle point of the section P2 may be determined as a predictor for the current pixel P. If the extended line 150 passes through the section P3, a weighted average value (2*A+2*B+2)>>2 considering a distance between the neighboring pixels A and B and a middle point of the section P3 may be determined as a predictor for the current pixel P. If the extended line 150 passes through the section P4, a weighted average value (1*A+3*B+2)>>2 considering a distance between the neighboring pixels A and B and a middle point of the section P4 may be determined as a predictor for the current pixel P. If the extended line 150 passes through the section P5, a value of the neighboring pixel B may be determined as a predictor for the current pixel P.

Also, if two neighboring pixels, that is, the neighboring pixel A on the up side and the neighboring pixel B on the left side meet the extended line 150 as shown in FIG. 17A, an average value of the neighboring pixel A and the neighboring pixel B may be used as a predictor for the current pixel P, or if (dx*dy) is a positive value, the neighboring pixel A on the up side may be used, and if (dx*dy) is a negative value, the neighboring pixel B on the left side may be used.

The intra prediction modes having various directivities as shown in Table 2 may be preset at an encoding end and a decoding end, and only a corresponding index of an intra prediction mode set for each coding unit may be transmitted.

Figure 29:
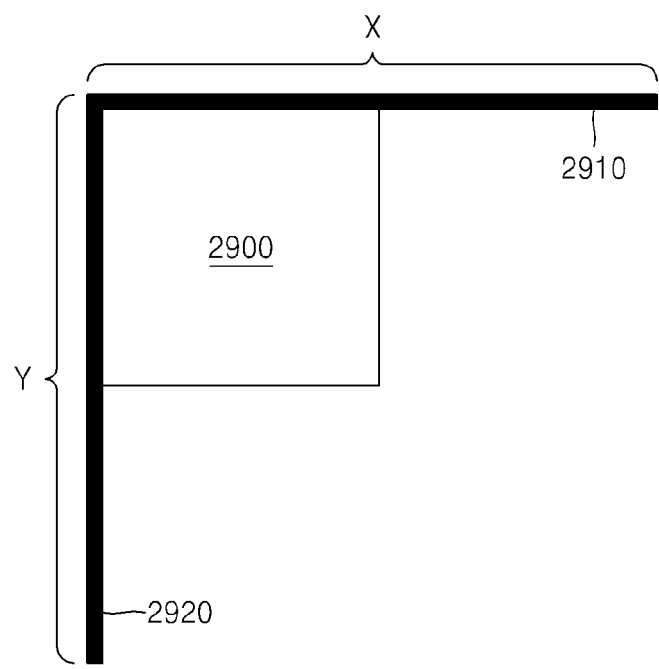
FIG. 29 is a diagram illustrating a current coding unit and neighboring pixels to be used for intra prediction, according to an exemplary embodiment.

FIG. 29 is a diagram illustrating a current coding unit 2900 and neighboring pixels 2910 and 2920 to be used for intra prediction, according to an exemplary embodiment.

Referring to FIG. 29, neighboring pixels 2910 at the upper side of the current coding unit 2900 and neighboring pixels 2920 at the left side of the current coding unit 2900 may be used for intra prediction of the current coding unit 2900. As shown in FIG. 29, like lower portion of neighboring pixels 2920, downleft pixels included in the neighboring block not yet encoded can be used also for intra prediction of current coding unit 2900. The number of the neighboring pixels 2910 and 2920 used for intra prediction of the current coding unit 2900 is not limited thereto and may be changed in consideration of the directivity of an intra prediction mode applied to the current coding unit 2900. Thus, according to an exemplary embodiment, the neighboring pixels used for intra prediction of the current coding unit may include left below neighboring pixels and right above neighboring pixel about current coding unit as well as left neighboring pixels and above neighboring pixels.

Figure 18:
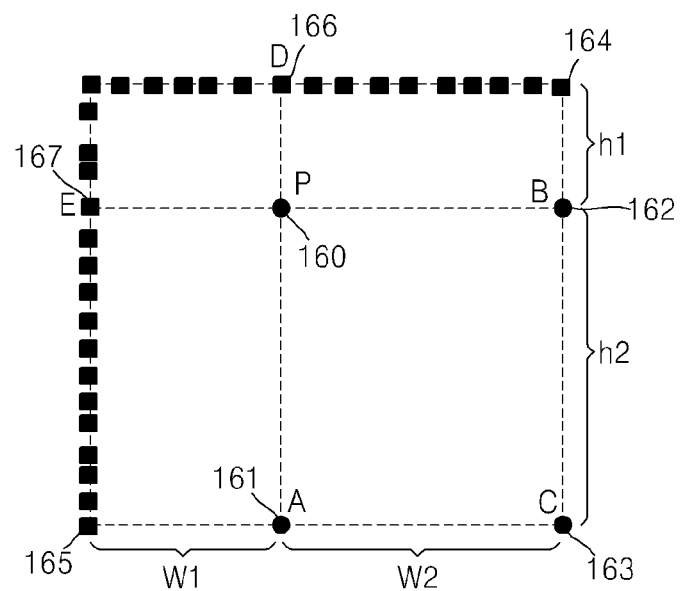
FIG. 18 is a reference diagram for explaining a bilinear mode according to an exemplary embodiment.

FIG. 18 is a reference diagram for explaining a bilinear mode according to an exemplary embodiment.

Referring to FIG. 18, in a bilinear mode, a geometric average value considering distances to up, down, left, and right borders of the current pixel P and pixels located at the up, down, left, and right borders about the current pixel P to be predicted in a current coding unit is calculated and a result of the calculation is used as a predictor for the current pixel P. That is, in a bilinear mode, a geometric average value of a distances to up, down, left, and right borders of the current pixel P and a pixel A 161, a pixel B 162, a pixel D 166, and a pixel E 167 which are located at the up, down, left, and right borders of the current pixel P is used as a predictor for the current pixel P. Since the bilinear mode is one of intra prediction modes, neighboring pixels on up and left sides which are previously encoded and then restored should also be used as reference pixels during prediction. Accordingly, corresponding pixel values in the current coding unit are not used as the pixel A 161 and the pixel B, but virtual pixel values generated by using neighboring pixels on up and left sides are used.

For example, first, a virtual pixel C 163 at a right down side of a current coding unit may be calculated by using an average value of a neighboring pixel LeftDownPixel 165 at a left down side and a neighboring pixel RightUpPixel 164 at a right up side adjacent to the current coding unit as shown in Equation 1.

$$C=0.5(LeftDownPixel+RightUpPixel)$$  [Equation 1]

The virtual pixel C 163 may be obtained by shifting operation as The Equation 1 may be the predictor for the current pixel P may be obtained by shift operation as C=0.5(LeftDownPixel+RightUpPixel+1)>>1.

Next, a value of a virtual pixel A 161 located on the down border when the current pixel P is extended downward by considering a distance W2 to the right border and a distance W1 to the left border of the current pixel P may be obtained by using an average value of the neighboring pixel LeftDownPixel 165 and the virtual pixel C 163 considering the distance W1 and W2. For example, the value of the virtual pixel A 161 may be calculated using one equation shown in Equation 2.

$$A=(C*W1+LeftDownPixel*W2)/(W1+W2);$$

$$A=(C*W1+LeftDownPixel*W2+((W1+W2)/2))/(W1+W2)$$  [Equation 2]

When a value of W1+W2 in Equation 2 is a power of 2, like 2^n, A=(C*W1+LeftDownPixel*W2+((W1+W2)/2))/(W1+W2) may be calculated by shift operation as A=(C*W1+LeftDownPixel*W2+2^(n−1))>>n without division.

Likewise, a value of a virtual pixel B 162 located on the right border when the current pixel P is extended rightward by considering a distance h2 to the down border and a distance h1 to the up border of the current pixel P may be obtained by using an average value of the neighboring pixel RightUpPixel 164 considering the distance h1 and h2. For example, the value of the virtual pixel B 162 may be calculated using one equation shown in Equation 3.

$$B=(C*h1+RightUpPixel*h2)/(h1+h2);$$

$$B=(C*h1+RightUpPixel*h2+((h1+h2)/2))/(h1+h2)$$  [Equation 3]

When a value of h1+h2 in Equation 3 is a power of 2, like 2^m, B=(C*h1+RightUpPixel*h2+((h1+h2)/2))/(h1+h2) may be calculated by shift operation as B=(C*h1+RightUpPixel*h2+2^(m−1))>>m without division.

Once the values of the virtual pixel B 162 on the right border and the virtual pixel A 161 on the down border of the current pixel P 160 are determined by using Equations 1 through 3, a predictor for the current pixel P 160 may be determined by using an average value of A+B+D+E. In detail, a weighted average value considering a distance between the current pixel P 160 and the virtual pixel A 161, the virtual pixel B 162, the pixel D 166, and the pixel E 167 or an average value of A+B+D+E may be used as a predictor for the current pixel P 160. For example, if a weighted average value is used and the size of block is 16×16, a predictor for the current pixel P may be obtained as (h1*A+h2*D+W1*B+W2*E+16)>>5. Such bilinear prediction is applied to all pixels in the current coding unit, and a prediction coding unit of the current coding unit in a bilinear prediction mode is generated.

Since prediction encoding is performed according to intra prediction modes that vary according to a size of a coding unit, more efficient compression may be achieved according to characteristics of an image.

Since a greater number of intra prediction modes than intra prediction modes used in a conventional codec are used according to a size of a coding unit according to an exemplary embodiment, compatibility with the conventional codec may become a problem. In a conventional art, 9 intra prediction modes at the most may be used as shown in FIGS. 13A and 13B. Accordingly, it is necessary to map intra prediction modes having various directions selected according to an exemplary embodiment to one of a smaller number of intra prediction modes. That is, when a number of available intra prediction modes of a current coding unit is N1 (N1 is an integer), in order to make the available intra prediction modes of the current coding unit compatible with a coding unit of a predetermined size including N2 (N2 is an integer different from N1) intra prediction modes, the intra prediction modes of the current coding unit may be mapped to an intra prediction mode having a most similar direction from among the N2 intra prediction modes. For example, a total of 33 intra prediction modes are available as shown in Table 2 in the current coding unit, and it is assumed that an intra prediction mode finally applied to the current coding unit is the mode 14, that is, (dx,dy)=(4,3), having a directivity of tan$^{-1}$(3/4)≈36.87 (degrees). In this case, in order to match the intra prediction mode applied to the current block to one of 9 intra prediction modes as shown in FIGS. 15A and 15B, the mode 4 (down_right) mode having a most similar directivity to the directivity of 36.87 (degrees) may be selected. That is, the mode 14 of Table 2 may be mapped to the mode 4 shown in FIG. 15A. Likewise, if an intra prediction mode applied to the current coding unit is selected to be the mode 15, that is, (dx,dy)=(1,11), from among the 33 available intra prediction modes of Table 2, since a directivity of the intra prediction mode applied to the current coding unit is tan$^{-1}$(11)≈84.80 (degrees), the mode 0 (vertical) of FIG. 13 having a most similar directivity to the directivity 84.80 (degrees) may be mapped to the mode 15.

Meanwhile, in order to decode a coding unit encoded through intra prediction, prediction mode information about through which intra prediction mode a current coding unit is encoded is required. Accordingly, when an image is encoded, information about an intra prediction mode of the current coding unit is added to a bitstream, and at this time, if the information about the intra prediction mode is added as it is to the bitstream for each coding unit, overhead is increased, thereby reducing compression efficiency. Accordingly, the information about the intra prediction mode of the current coding unit determined as a result of encoding of the current coding unit is not transmitted as it is, but only a difference value between a value of an actual intra prediction mode and a prediction value of an intra prediction mode predicted from neighboring coding units is transmitted.

If intra prediction modes having various directions selected according to an exemplary embodiment are used, a number of available intra prediction modes may vary according to a size of a coding unit. Accordingly, in order to predict an intra prediction mode of a current coding unit, it is necessary to map intra prediction modes of neighboring coding units to representative intra prediction modes. Here, representative intra prediction modes may be a smaller number of intra prediction modes from among intra prediction modes of available neighboring coding units, or 9 intra prediction modes as shown in FIG. 19.

Figure 19:
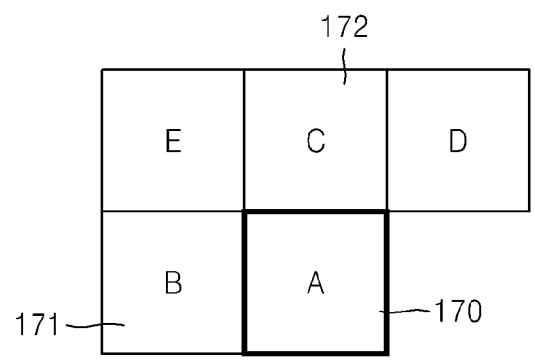
FIG. 19 is a diagram for explaining a process of generating a prediction value of an intra prediction mode of a current coding unit, according to an exemplary embodiment.

FIG. 19 is a diagram for explaining a process of generating a prediction value of an intra prediction mode of a current coding unit, according to an exemplary embodiment.

Referring to FIG. 19, when the current coding unit is A 170, an intra prediction mode of the current coding unit A 170 may be predicted from intra prediction modes determined from neighboring coding units. For example, if an intra prediction mode determined from a left coding unit B 171 of the current coding unit A 170 is a mode 3 and an intra prediction mode of an up encoding unit C 172 is a mode 4, an intra prediction mode of the current coding unit A 170 may be predicted to be a mode 3 having a smaller value from among the prediction modes of the up coding unit C 172 and the left coding unit B 171. If an intra prediction mode determined as a result of actual intra prediction encoding performed on the current coding unit A 170 is a mode 4, only a difference 1 from the mode 3 that is a value of the intra prediction mode predicted from the neighboring coding units is transmitted as intra prediction mode information for the current coding unit A 170. When an image is decoded, in the same manner, a prediction value of an intra prediction mode of a current decoding unit is generated, a mode difference value transmitted through a bitstream is added to the prediction value of the intra prediction mode, and intra prediction mode information actually applied to the current decoding unit is obtained. Although only the neighboring coding units located on the up and left sides of the current coding unit are used in the above description, an intra prediction mode of the current coding unit A 170 may be predicted by using other neighboring coding units such as E and D of FIG. 19.

Since intra prediction modes actually performed vary according to sizes of coding units, an intra prediction mode predicted from neighboring coding units may not be matched with an intra prediction mode of the current coding unit. Accordingly, in order to predict an intra prediction mode of a current coding unit from neighboring coding units having different sizes, a mapping process for unifying intra prediction modes of the coding units having different intra prediction modes is required.

Figure 20A:
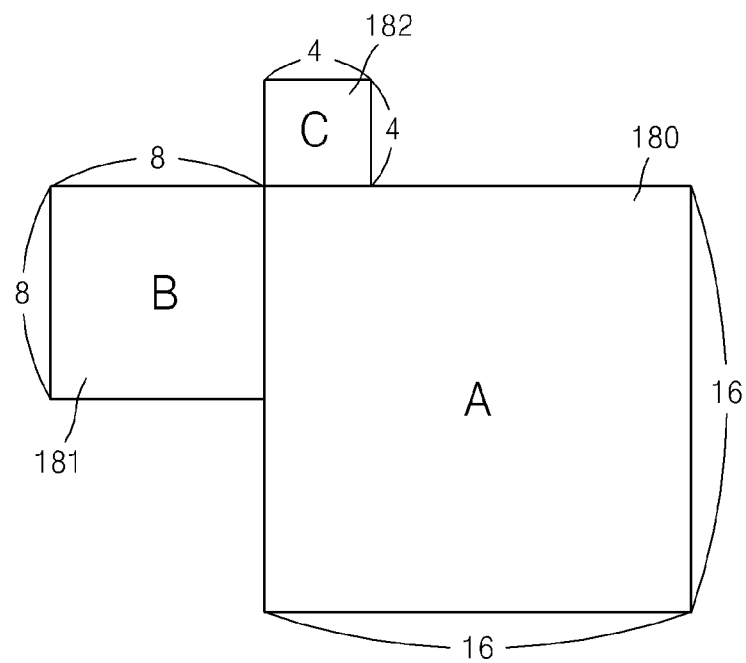
FIGS. 20A-B are reference diagrams for explaining a mapping process of unifying intra prediction modes of coding units having different sizes, according to an exemplary embodiment.
Figure 20B:
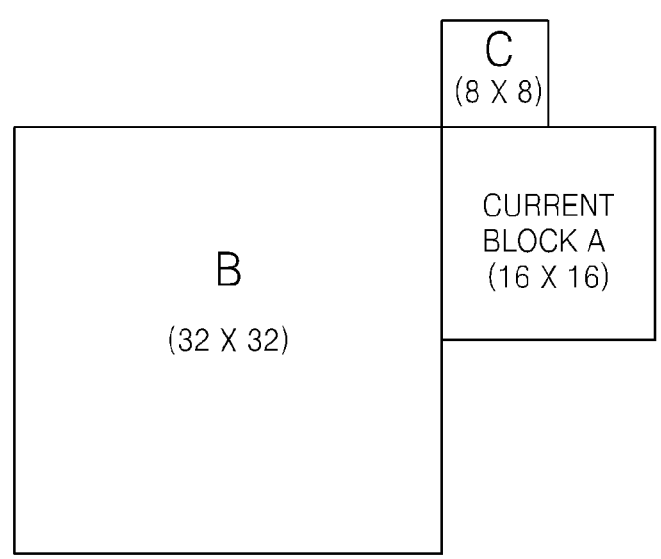

FIGS. 20A and 20B are reference diagrams for explaining a mapping process for unifying intra prediction modes of coding units having different sizes, according to an exemplary embodiment.

Referring to FIG. 20A, it is assumed that a current coding unit A 180 has a size of 16×16, a left coding unit B 181 has a size of 8×8, and an up coding unit C 182 has a size of 4×4. Also, as shown in FIG. 14, it is assumed that numbers of available intra prediction modes of the coding units having the sizes of 4×4, 8×8, and 16×16 are respectively 9, 9, and 33. In this case, since the numbers of the available intra prediction modes of the left coding unit B 181 and the up coding unit C 182 are different from the number of the available intra prediction modes of the current coding unit A 180, an intra prediction mode predicted from the left coding unit B 181 and the up coding unit C 182 is not suitable to be used as a prediction value of an intra prediction mode of the current coding unit A 180. Accordingly, in FIG. 20A, intra prediction modes of the neighboring coding units B and C 181 and 182 are respectively changed to first and second representative intra prediction modes having a most similar direction from among a predetermined number of representative intra prediction modes, and a mode with a smaller value from among the first and second representative intra prediction modes is selected as a final representative intra prediction mode. And, an intra prediction mode having a most similar direction to the representative intra prediction mode selected from among the intra prediction modes available according to a size of the current coding unit 1080 is predicted to be an intra prediction mode of the current coding unit 1080.

Alternatively, referring to FIG. 20B, it is assumed that a current coding unit A has a size of 16×16, a left coding unit B has a size of 32×32, and an up coding unit C has a size of 8×8. Also, as shown in FIG. 14, it is assumed that numbers of available intra prediction modes of the coding units having the sizes of 8×8, 16×16, and 32×32 are respectively 9, 9, and 33. Also, it is assumed that an intra prediction mode of the left coding unit B is a mode 4, and an intra prediction mode of the up coding unit C is a mode 31. In this case, since the intra prediction modes of the left coding unit B and the up coding unit C are not compatible with each other, each of the intra prediction modes of the left coding unit B and the up coding unit C is mapped to one of representative intra prediction modes shown in FIG. 21. Since the mode 31 that is the intra prediction mode of the left coding unit B has a directivity of (dx,dy)=(4, −3) as shown in Table 2, a mode 5 having a most similar directivity to $\tan^{-1}(-3/4)$ from among the representative intra prediction modes of FIG. 21 is mapped, and since the intra prediction mode 4 of the up coding unit C has the same directivity as that of the mode 4 from among the representative intra prediction modes of FIG. 21, the mode 4 is mapped.

The mode 4 having a smaller mode value from among the mode 5 that is the mapped intra prediction mode of the left coding unit B and the mode 4 that is the mapped intra prediction mode of the up coding unit C may be determined to be a prediction value of an intra prediction mode of the current coding unit, and only a mode difference value between an actual intra prediction mode and a predicted intra prediction mode of the current coding unit may be encoded as prediction mode information of the current coding unit.

Figure 21:
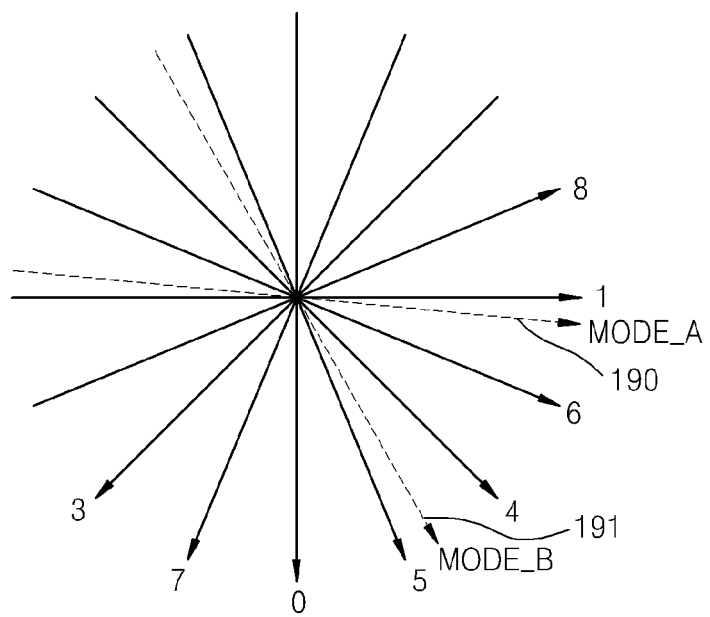
FIG. 21 is a reference diagram for explaining a process of mapping intra prediction modes of neighboring coding units to one of representative intra prediction modes, according to an exemplary embodiment.

FIG. 21 is a reference diagram for explaining a process of mapping intra prediction modes of neighboring coding units to one of representative intra prediction modes, according to an exemplary embodiment. In FIG. 21, as representative intra prediction modes, a vertical mode, a horizontal mode, a DC mode, a diagonal left mode, a diagonal right mode, a vertical right mode, a vertical left mode, a horizontal up mode, and a horizontal down mode are set. However, the representative intra prediction modes are not limited thereto, and may be set to have a various number of directivities.

Referring to FIG. 21, a predetermined number of representative intra prediction modes are previously set, and intra prediction modes of neighboring coding units are mapped to a representative intra prediction mode having a most similar direction. For example, if a determined intra prediction mode of the up coding unit A is an intra prediction mode MODE_A (190) having a directivity, the intra prediction mode MODE_A(190) of the up coding unit A is mapped to MODE 1 having a most similar direction from among 9 preset representative intra prediction modes 1 through 9. Likewise, if a determined intra prediction mode of the left coding unit B is an intra prediction mode MOD_B(191) having a directivity, the intra prediction mode MODE_B(191) of the left coding unit B is mapped to MODE 5 having a most similar direction from among the 9 preset representative intra prediction modes 1 through 9.

Next, a mode having a smaller value from among a first representative intra prediction mode and a second representative intra prediction mode is selected as a final representative intra prediction mode of a neighboring coding unit. The reason why a representative intra prediction mode having a smaller mode value is selected is that a smaller mode value is set to more often generated intra prediction modes. That is, if different intra prediction modes are predicted from neighboring coding units, since an intra prediction mode having a smaller mode value has a higher occurrence possibility, it is preferable to select a prediction mode having a smaller value as a predictor for a prediction mode of the current coding unit when there are different prediction modes.

Although a representative intra prediction mode is selected from neighboring coding units, the representative intra prediction mode may not be used as it is as a predictor of an intra prediction mode of a current coding unit sometimes. If the current coding unit A 180 has 33 intra prediction modes and a representative intra prediction mode has 9 intra prediction modes as described with reference to FIG. 20, an intra prediction mode of the current coding unit A 180 corresponding to a representative intra prediction mode does not exist. In this case, in a similar manner to that used to map intra prediction modes of neighboring coding units to a representative intra prediction mode as described above, an intra prediction mode having a most similar direction to a representative intra prediction mode selected from intra prediction modes according to a size of a current coding unit may be selected as a final predictor of an intra prediction mode of the current coding unit. For example, if a representative intra prediction mode finally selected from neighboring coding units in FIG. 21 is MODE 1, an intra prediction mode having a most similar directivity to MODE 1 from among intra prediction modes available according to the size of the current coding unit may be finally selected as a predictor of the intra prediction mode of the current coding unit.

Meanwhile, as described with reference to FIGS. 15A through 15C, if a predictor for the current pixel P is generated by using neighboring pixels on or close to the extended line 150, the extended line 150 has actually a directivity of $\tan^{-1}(dy/dx)$. In order to calculate the directivity, since division (dy/dx) is necessary, calculation is made down to decimal places when hardware or software is used, thereby increasing the amount of calculation. Accordingly, a process of setting dx and dy is used in order to reduce the amount of calculation when a prediction direction for selecting neighboring pixels to be used as reference pixels about a pixel in a coding unit is set by using dx, and dy parameters in a similar manner to that described with reference to Table 2.

Figure 25:
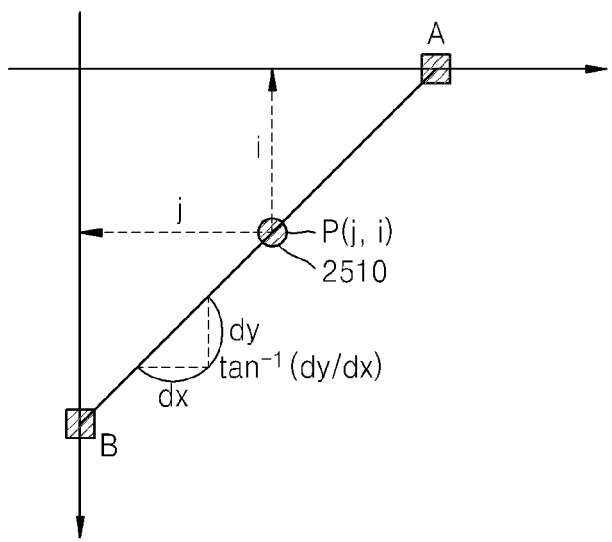
FIG. 25 is a diagram for explaining a relationship between a current pixel and neighboring pixels located on an extended line having a directivity of (dx, dy)

FIG. 25 is a diagram for explaining a relationship between a current pixel and neighboring pixels located on an extended line having a directivity of (dy/dx), according to an exemplary embodiment.

Referring to FIG. 25, it is assumed that a location of the current pixel P is P(j,i), and an up neighboring pixel and a left neighboring pixel B located on an extended line 2510 having a directivity, that is, a gradient, of $\tan^{-1}(dy/dx)$ and passing through the current pixel P are respectively A and B. When it is assumed that locations of up neighboring pixels correspond to an X-axis on a coordinate plane, and locations of left neighboring pixels correspond to a y-axis on the coordinate plate, the up neighboring pixel A is located at (j+i*dx/dy,0), and the left neighboring pixel B is located at (0,i+j*dy/dx). Accordingly, in order to determine any one of the up neighboring pixel A and the left neighboring pixel B for predicting the current pixel P, division, such as dx/dy or dy/dx, is required. Such division is very complex as described above, thereby reducing a calculation speed of software or hardware.

Accordingly, a value of any one of dx and dy representing a directivity of a prediction mode for determining neighboring pixels may be determined to be a power of 2. That is, when n and m are integers, dx and dy may be $2^n$ and $2^m$, respectively.

Referring to FIG. 25, if the left neighboring pixel B is used as a predictor for the current pixel P and dx has a value of $2^n$, j*dy/dx necessary to determine (0,i+j*dy/dx) that is a location of the left neighboring pixel B becomes (j*dy/($2^n$)), and division using such a power of 2 is easily obtained through shift operation as (j*dy)>>n, thereby reducing the amount of calculation.

Likewise, if the up neighboring pixel A is used as a predictor for the current pixel P and dy has a value of $2^m$, i*dx/dy necessary to determine (j+i*dx/dy,0) that is a location of the up neighboring pixel A becomes (i*dx)/($2^m$), and division using such a power of 2 is easily obtained through shift operation as (i*dx)>>m.

Figure 26:
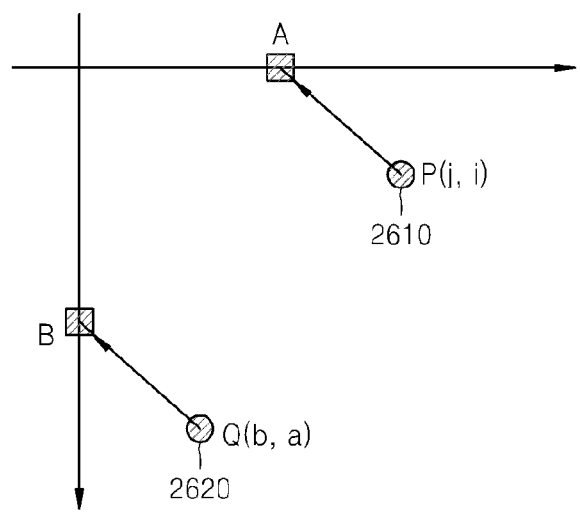
FIG. 26 is a diagram for explaining a change in a neighboring pixel located on an extended line having a directivity of (dx, dy) according to a location of a current pixel, according to an exemplary embodiment.

FIG. 26 is a diagram for explaining a change in a neighboring pixel located on an extended line having a directivity of (dx,dy) according to a location of a current pixel, according to an exemplary embodiment.

As a neighboring pixel necessary for prediction according to a location of a current pixel, any one of an up neighboring pixel and a left neighboring pixel is selected.

Referring to FIG. 26, when a current pixel 2610 is P(j,i) and is predicted by using a neighboring pixel located in a prediction direction, an up pixel A is used to predict the current pixel P 2610. When the current pixel 2610 is Q(b,a), a left pixel B is used to predict the current pixel Q 2620.

Figure 24:
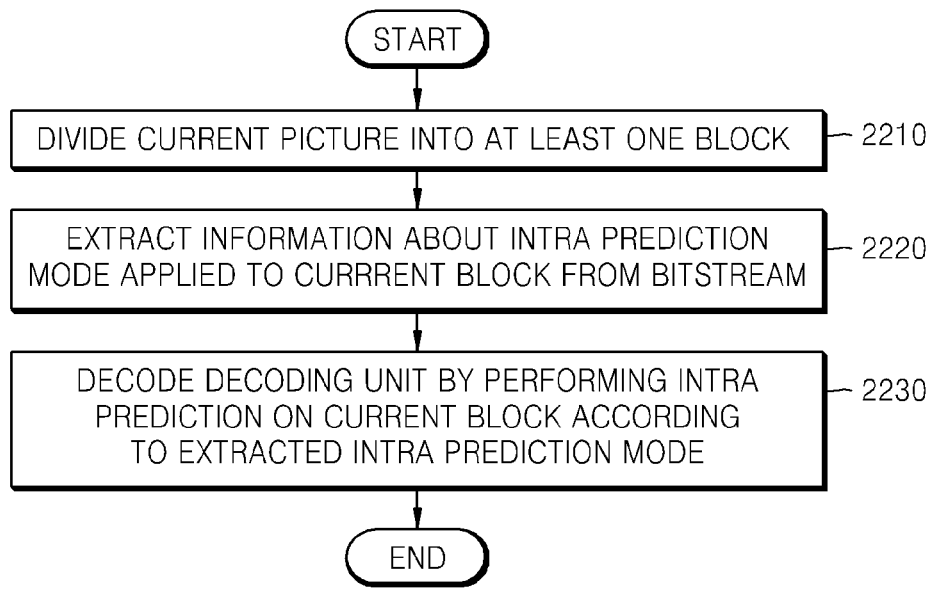
FIG. 24 is a flowchart illustrating a method of decoding an image, according to an exemplary embodiment.

If only a dy component of a y-axis direction from among (dx, dy) representing a prediction direction has a power of 2 like $2^m$, while the up pixel A in FIG. 24 may be determined through shift operation without division such as (j+(i*dx)>>m, 0), the left pixel B requires division such as (0, a+b*$2^m$/dx). Accordingly, in order to exclude division when a predictor is generated for all pixels of a current block, all of dx and dy may have a type of power of 2.

Figure 27:
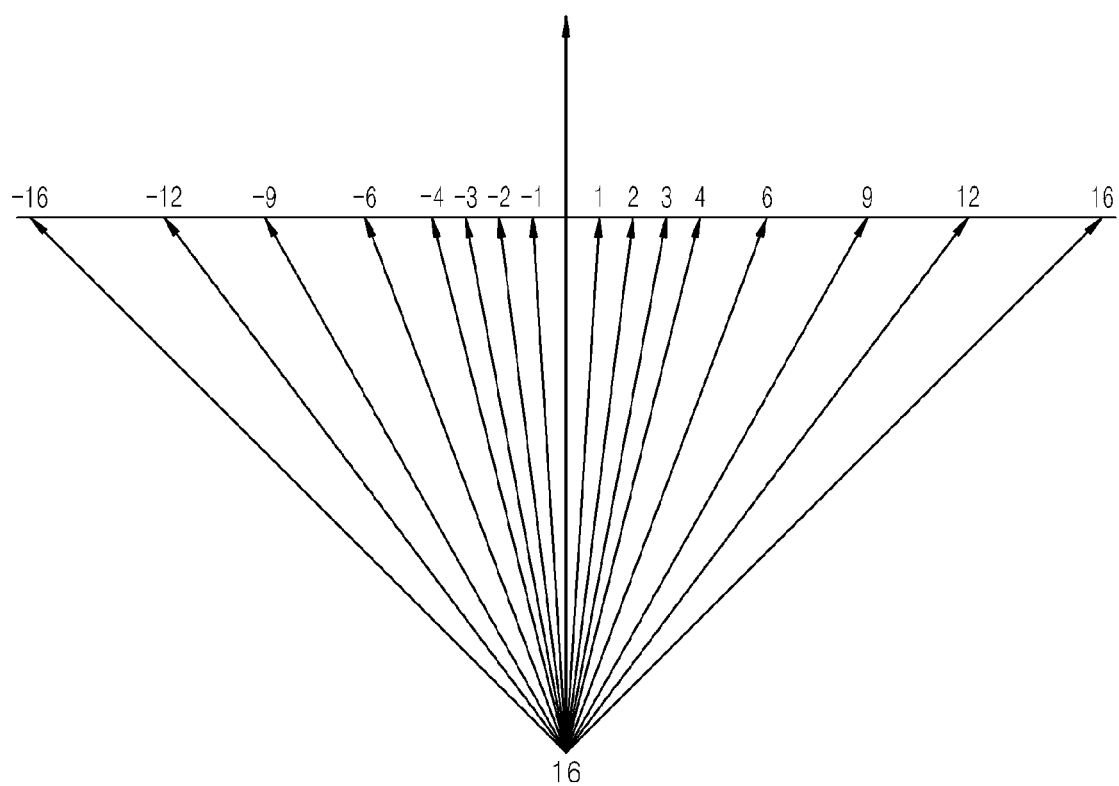
FIGS. 27 and 28 are diagrams for explaining a method of determining an intra prediction mode direction, according to exemplary embodiments.
Figure 28:
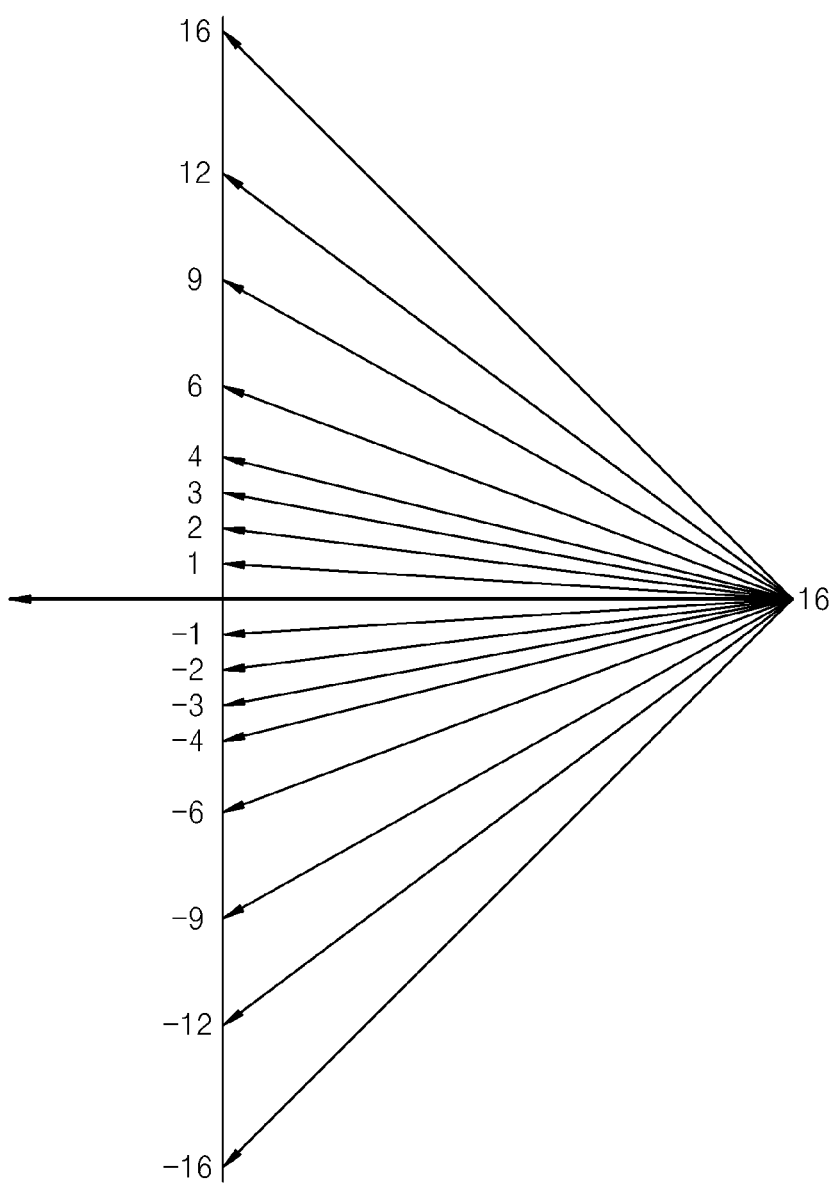

FIGS. 27 and 28 are diagrams for explaining a method of determining an intra prediction mode direction, according to exemplary embodiments.

In general, there are many cases where linear patterns shown in an image or a video signal are vertical or horizontal. Accordingly, when intra prediction modes having various directivities are defined by using parameters dx and dy, image coding efficiency may be improved by defining values dx and dy as follows.

In detail, if dy has a fixed value of $2^m$, an absolute value of dx may be set so that a distance between prediction directions close to a vertical direction is narrow, and a distance between prediction modes closer to a horizontal direction is wider. For example, referring to FIG. 27, if dy has a value of $2^4$, that is, 16, a value of dx may be set to be 1, 2, 3, 4, 6, 9, 12, 16, 0, −1, −2, −3, −4, −6, −9, −12, and −16 so that a distance between prediction directions close to a vertical direction is narrow and a distance between prediction modes closer to a horizontal direction is wider.

Likewise, if dx has a fixed value of 2^n, an absolute value of dy may be set so that a distance between prediction directions close to a horizontal direction is narrow and a distance between prediction modes closer to a vertical direction is wider. For example, referring to FIG. 28, if dx has a value of 2^4, that is, 16, a value of dy may be set to be 1, 2, 3, 4, 6, 9, 12, 16, 0, −1, −2, −3, −4, −6, −9, −12, and −16 so that a distance between prediction directions close to a horizontal direction is narrow and a distance between prediction modes closer to a vertical direction is wider.

Also, when one of values of dx and dy is fixed, the remaining value may be set to be increased according to a prediction mode. For example, if dy is fixed, a distance between dx may be set to be increased by a predetermined value. Also, an angle of a horizontal direction and a vertical direction may be divided in predetermined units, and such an increased amount may be set in each of the divided angles. For example, if dy is fixed, a value of dx may be set to have an increased amount of a in a section less than 15 degrees, an increased amount of b in a section between 15 degrees and 30 degrees, and an increased width of c in a section greater than 30 degrees. In this case, in order to have such a shape as shown in FIG. 25, the value of dx may be set to satisfy a relationship of a<b<c.

For example, prediction modes described with reference to FIGS. 25 through 28 may be defined as a prediction mode having a directivity of $\tan^{-1}(dy/dx)$ by using (dx, dy) as shown in Tables 3 through 5.

TABLE 3

| dx | Dy | dx | dy | dx | dy |
|---|---|---|---|---|---|
| −32 | 32 | 21 | 32 | 32 | 13 |
| −26 | 32 | 26 | 32 | 32 | 17 |
| −21 | 32 | 32 | 32 | 32 | 21 |
| −17 | 32 | 32 | −26 | 32 | 26 |
| −13 | 32 | 32 | −21 | 32 | 32 |
| −9 | 32 | 32 | −17 | | |
| −5 | 32 | 32 | −13 | | |
| −2 | 32 | 32 | −9 | | |
| 0 | 32 | 32 | −5 | | |
| 2 | 32 | 32 | −2 | | |
| 5 | 32 | 32 | 0 | | |
| 9 | 32 | 32 | 2 | | |
| 13 | 32 | 32 | 5 | | |
| 17 | 32 | 32 | 9 | | |

TABLE 4

| dx | Dy | dx | dy | dx | Dy |
|---|---|---|---|---|---|
| −32 | 32 | 19 | 32 | 32 | 10 |
| −25 | 32 | 25 | 32 | 32 | 14 |
| 9 | 32 | 32 | 32 | 32 | 19 |
| −14 | 32 | 32 | −25 | 32 | 25 |
| −10 | 32 | 32 | −19 | 32 | 32 |
| −6 | 32 | 32 | −14 | | |
| −3 | 32 | 32 | −10 | | |
| −1 | 32 | 32 | −6 | | |
| 0 | 32 | 32 | −3 | | |
| 1 | 32 | 32 | −1 | | |
| 3 | 32 | 32 | 0 | | |
| 6 | 32 | 32 | 1 | | |
| 10 | 32 | 32 | 3 | | |
| 14 | 32 | 32 | 6 | | |

TABLE 5

| dx | Dy | dx | dy | dx | dy |
|---|---|---|---|---|---|
| −32 | 32 | 23 | 32 | 32 | 15 |
| −27 | 32 | 27 | 32 | 32 | 19 |
| −23 | 32 | 32 | 32 | 32 | 23 |
| −19 | 32 | 32 | −27 | 32 | 27 |
| −15 | 32 | 32 | −23 | 32 | 32 |
| −11 | 32 | 32 | −19 | | |
| −7 | 32 | 32 | −15 | | |
| −3 | 32 | 32 | −11 | | |
| 0 | 32 | 32 | −7 | | |
| 3 | 32 | 32 | −3 | | |
| 7 | 32 | 32 | 0 | | |
| 11 | 32 | 32 | 3 | | |
| 15 | 32 | 32 | 7 | | |
| 19 | 32 | 32 | 11 | | |

Figure 22:
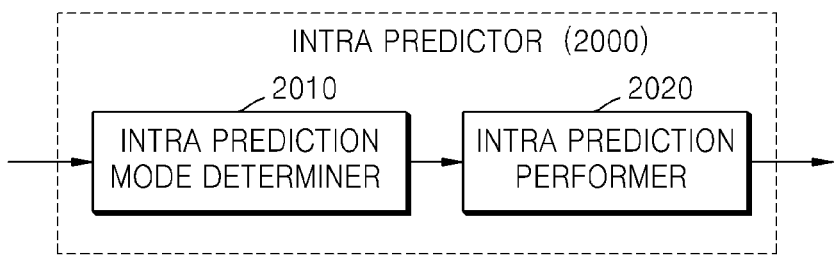
FIG. 22 is a block diagram of an intra prediction apparatus according to an exemplary embodiment.

FIG. 22 is a block diagram of an intra prediction apparatus 200 according to an exemplary embodiment. The intra prediction apparatus 200 may operate as the intra predictor 410 of the apparatus 400 of FIG. 4 and the intra predictor 550 of the apparatus 500 of FIG. 5.

Referring to FIG. 22, an intra prediction mode determiner 2010 determines an intra prediction mode to be applied to a current coding unit according to a size of each of coding units split based on a maximum coding unit and depth as described above. That is, the intra prediction mode determiner 2010 determines intra prediction modes to be applied according to a size of a current coding unit from among intra prediction modes having various directions.

An intra prediction performer 2020 performs intra prediction on each coding unit by using the determined intra prediction modes. An optimum intra prediction mode having a least error value from among error values between an original coding unit and a prediction coding unit generated as a result of the intra prediction performed by the intra prediction performer 2020 is determined as a final intra prediction mode of the coding unit.

Meanwhile, if the intra prediction apparatus 2000 illustrated in FIG. 22 is applied to a decoding apparatus, the intra prediction mode determiner 2010 determines a size of a current decoding unit by using a maximum coding unit extracted from a bitstream encoded by the entropy decoder 520 of FIG. 5 and depth information that is obtained by hierarchically split the maximum coding unit. Also, the intra prediction performer 2020 generates a prediction decoding unit by performing intra prediction on a decoding unit according to an extracted intra prediction mode. The prediction decoding unit is added to residual data restored from the bitstream to perform decoding on the decoding unit.

Figure 23:
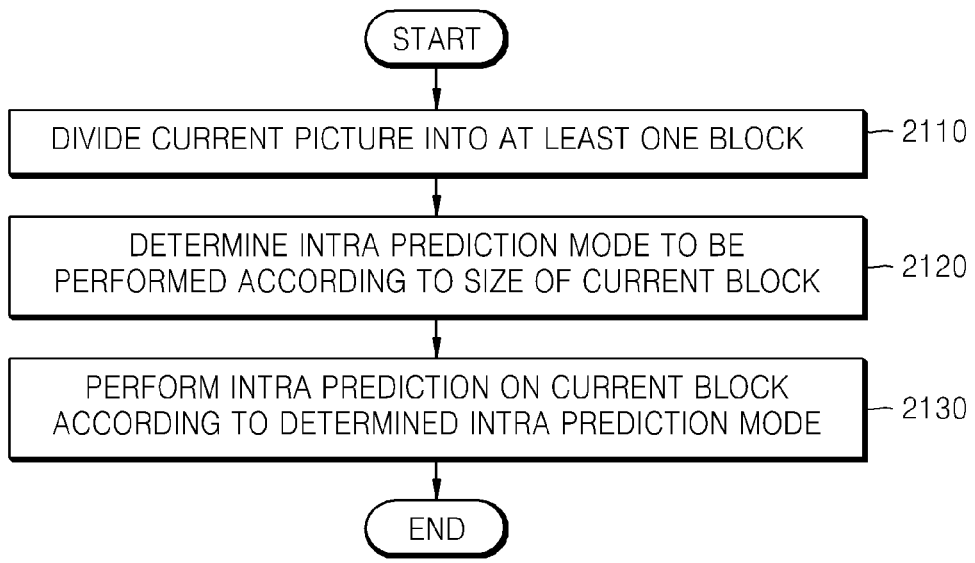
FIG. 23 is a flowchart illustrating a method of encoding an image, according to an exemplary embodiment.

FIG. 23 is a flowchart illustrating a method of encoding an image, according to an exemplary embodiment.

Referring to FIG. 23, in operation 2110, a current picture is divided into at least one block. As described above, the current picture may be divided based on a maximum coding unit that is a coding unit having a maximum size and a depth that is obtained by hierarchically split the maximum coding unit.

In operation 2120, an intra prediction mode to be performed for a current block according to a size of the current block is determined. As described above, the intra prediction mode includes a prediction mode for performing prediction by using pixels of neighboring blocks on or close to an extended line having an angle of $\tan^{-1}(dy/dx)$ about each pixel inside the current block.

In operation 2130, intra prediction is performed on the current block according to the determined intra prediction mode. An intra prediction mode having a least prediction error value from among intra prediction modes is selected as a final intra prediction mode of the current block.

FIG. 24 is a flowchart illustrating a method of decoding an image, according to an exemplary embodiment.

Referring to FIG. 24, in operation 2210, a current picture is divided into at least one block having a predetermined size. Here, the current picture may be divided based on a maximum decoding unit that is a decoding unit having a maximum size extracted from a bitstream and depth information that is obtained by hierarchically split the maximum decoding unit.

In operation 2220, information about an intra prediction mode applied to a current block is extracted from the bitstream. The intra prediction mode includes a prediction mode for performing prediction by using pixels of neighboring blocks on or close to an extended line having an angle of $\tan^{-1}(dy/dx)$ (dx and dy are integers) about each pixel inside the current block. As described above with reference to FIGS. 19 through 21, if a predictor of an intra prediction mode predicted from intra prediction modes of the neighboring decoding units is used, intra prediction modes of the neighboring decoding units of a current decoding unit are mapped to representative intra prediction modes, and a representative intra prediction mode having a smaller mode value from among the representative intra prediction modes is selected as a final representative intra prediction mode. And, an intra prediction mode having a most similar direction to the final representative intra prediction mode from among available intra prediction modes determined according to a size of the current decoding unit is selected as a predictor of the intra prediction mode of the current decoding unit, a difference value between predictors of the intra prediction mode and an actual intra prediction mode included in the bitstream is extracted, and the difference value is added to the predictor of the intra prediction mode, thereby determining the intra prediction mode of the current decoding unit.

In operation 2230, a decoding unit is decoded by performing intra prediction on the decoding unit according to the extracted intra prediction mode.

The exemplary embodiments may be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus of decoding an image, the apparatus comprising:
    an entropy decoder which extracts information that indicates an intra prediction mode applied to a current block to be decoded, from a bitstream; and
    an intra prediction performer which performs intra prediction on the current block according to the intra prediction mode,
    wherein the intra prediction mode indicates a direction of the intra prediction for the current block including a current pixel, the intra prediction comprising:
        determining one of (i) at least one left neighboring pixel among left neighboring pixels adjacent to a left side of the current block and decoded prior to the current block, a location of the left neighboring pixel being determined based on dy number in a vertical direction and fixed integer number in a horizontal direction and (ii) at least one up neighboring pixel among up neighboring pixels adjacent to an upper side of the current block, a location of the up neighboring pixel being determined based on dx number in the horizontal direction and the fixed integer number in the vertical direction, where dx number and dy number are integers determined according to the intra prediction mode of the current block; and
        performing the intra prediction using the determined one of the at least one left neighboring pixel and the at least one up neighboring pixel,
    wherein the dx number and the dy number are determined among {32, 26, 21, 17, 13, 9, 2, 0, −2, −5 −9 −13, −17 −21, −26} according to the intra prediction mode of the current block,
    wherein the fixed integer number is power of 2,
    wherein the image is split into a plurality of maximum coding units according to information about maximum size of a coding unit,
    a maximum coding unit among the plurality of maximum coding units, is hierarchically split into one or more coding units of depths including at least one of a current depth and a lower depth according to split information,
    when the split information indicates a split for the current depth, a coding unit of the current depth is split into four coding units of the lower depth, independently from neighboring coding units, and
    when the split information indicates a non-split for the current depth, one or more prediction units are obtained from the coding unit of the current depth.

2. The apparatus of claim 1, wherein the one of the left neighboring pixel and the up neighboring pixel is determined by using a line extending through the current pixel, the line having an angle of $\tan^{-1}(dy/dx)$ about the current pixel.

* * * * *